US008780926B2

(12) United States Patent
Bando et al.

(10) Patent No.: US 8,780,926 B2
(45) Date of Patent: Jul. 15, 2014

(54) UPDATING PREFIX-COMPRESSED TRIES FOR IP ROUTE LOOKUP

(75) Inventors: Masanori Bando, Cupertino, CA (US); Hung-Hsiang Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 431 days.

(21) Appl. No.: 12/958,030

(22) Filed: Dec. 1, 2010

(65) Prior Publication Data
US 2011/0128960 A1    Jun. 2, 2011

Related U.S. Application Data

(60) Provisional application No. 61/265,397, filed on Dec. 1, 2009.

(51) Int. Cl.
*H04L 12/28* (2006.01)
*H04L 12/56* (2006.01)
(52) U.S. Cl.
CPC .......... *H04L 45/745* (2013.01); *H04L 45/7457* (2013.01)
USPC ...................................... 370/395.7

(58) Field of Classification Search
USPC ............ 370/235, 254–256, 389–395.32, 408, 370/351–400; 709/238–244
See application file for complete search history.

(56) References Cited

U.S. PATENT DOCUMENTS

| 7,274,697 | B2 * | 9/2007 | Ji et al. ......................... 370/392 |
| 7,990,893 | B1 * | 8/2011 | Singh ............................ 370/254 |
| 8,089,961 | B2 * | 1/2012 | Sahni et al. ................... 370/389 |
| 2002/0023089 | A1 * | 2/2002 | Woo .............................. 707/101 |
| 2003/0091043 | A1 * | 5/2003 | Mehrotra et al. ............. 370/389 |
| 2004/0006639 | A1 * | 1/2004 | Mathew et al. ............... 709/238 |
| 2004/0044787 | A1 * | 3/2004 | Vipat ............................. 709/238 |
| 2009/0327316 | A1 * | 12/2009 | Sahni et al. ................... 707/100 |
| 2011/0044351 | A1 * | 2/2011 | Punati et al. .................. 370/408 |

* cited by examiner

*Primary Examiner* — Kwang B Yao
*Assistant Examiner* — Juvena Loo
(74) *Attorney, Agent, or Firm* — John C. Pokotylo; Straub & Pokotylo

(57) ABSTRACT

A method and apparatus for updating stored data structures representing network forwarding information used for network route lookup is described. By making sure there is only one level of dependency between data structures storing forwarding information, these data structures may be updated quickly and with minimal overhead.

19 Claims, 34 Drawing Sheets

| FIGURE 7A |
|---|
| FIGURE 7B |

| FIGURE 12A |
|---|
| FIGURE 12B |

TABLE I
ROUTING TABLE STATISTICS - NUMBER OF SUB-TRIES IN EACH LEVEL
FOR THE THREE ROUTING TABLES.

| Level | IPv4 (Real) | IPv4 (2M) | Level | IPv6 |
|---|---|---|---|---|
| /16 (16-24bits) | 22,545 | 51,968 | /13 (13-21bits) | 33 |
| /25 (25-32bits) | 4,504 | 9,373 | /22 (22-30bits) | 233 |
| | | | /31 (31-39bits) | 6,768 |
| | | | /40 (40-48bits) | 117,298 |
| | | | /49 (49-57bits) | 7,372 |
| | | | /58 (58-63bits) | 2,562 |
| Total Sub-tries | 27,049 | 61,341 | | 134,266 |

FIGURE 28

TABLE II
ON-CHIP MEMORY REQUIREMENTS

|                    | IPv4 (Real) | IPv4 (2M) | IPv6     |
|--------------------|-------------|-----------|----------|
| # of Prefixes      | 318,043     | 2M        | 318,043  |
| Direct Lookup      | 256Kbits    | 256Kbits  | 32Kbits  |
| Hash Table         | 0.32Mbits   | 1.11Mbits | 2.1Mbits |
| Hash ID Table      | 15Kbits     | 60Kbits   | 43Kbits  |
| Black Sheep Memory | 0.53Mbits   | 0.05Mbits | 6Mbits   |
| Total              | 1.11Mbits   | 1.47Mbits | 8.17Mbits|

FIGURE 29

TABLE III
CONFIGURATIONS FOR NUMBER OF GROUPS AND NUMBER OF BINS IN
EACH GROUP. (Gr. : Group)

|     | IPv4 (Real) | | IPv4 (2M) | |     | IPv6 | |
| --- | --- | --- | --- | --- | --- | --- | --- |
|     | #ofGr. | Gr.Size | #ofGr. | Gr.Size |     | #ofGr. | Gr.Size |
| /16 | 2,048 | 8 | 8,192 | 8 | /13 | 32 | 8 |
| /25 | 512 | 8 | 2,048 | 8 | /22 | 128 | 8 |
|     |       |   |       |   | /31 | 512 | 8 |
|     |       |   |       |   | /40 | 4,096 | 8 |
|     |       |   |       |   | /49 | 2,048 | 8 |
|     |       |   |       |   | /58 | 512 | 8 |

FIGURE 30

TABLE IV
PREFIX-COMPRESSED TRIE BITMAP MEMORY
REQUIREMENT COMPARED WITH TREE BITMAP

|              | IPv4(Real) | IPv4(2M)  | IPv6       |
|--------------|------------|-----------|------------|
| # of Sub-Trie | 18,537    | 60,125    | 118,867    |
| Tree Bitmap  | 18.8Mbits  | 61.0Mbits | 120.5Mbits |
| PC-Trie 2    | 4.5Mbits   | 14.8Mbits | 30.8Mbits  |
| PC-Trie 4    | 2.4Mbits   | 7.9Mbits  | 16.5Mbits  |
| PC-Trie 8    | 1.4Mbits   | 4.5Mbits  | 9.3Mbits   |
| PC-Trie 16   | 0.9Mbits   | 2.8Mbits  | 5.8Mbits   |

FIGURE 31

TABLE V
NEXT HOP INFORMATION MEMORY REQUIREMENTS (TAKING NEXT HOP INFORMATION AS 8 BITS)
COMPARED WITH TREE BITMAP

| # of Routes | IPv4 (Real) 318.043 | | IPv4 (2M) 2.000.000 | | IPv6 318.043 | |
|---|---|---|---|---|---|---|
| | # of NHIsets | Memory | # of NHIsets | Memory | # of NHIsets | Memory |
| Tree Bitmap | 315,462 | 2.4Mbits | 1,999,580 | 15.3Mbits | 318,036 | 2.4Mbits |
| PC-Trie 2 | 219,609 | 3.4Mbits | 1,810,091 | 27.6Mbits | 386,900 | 5.2Mbits |
| PC-Trie 4 | 153,936 | 4.7Mbits | 1,514,739 | 46.2Mbits | 361,773 | 11Mbits |
| PC-Trie 8 | 111,152 | 6.8Mbits | 1,129,956 | 69Mbits | 344,058 | 21Mbits |
| PC-Trie 16 | 80,790 | 9.9Mbits | 715,048 | 87.3Mbits | 321,410 | 39.2Mbits |

FIGURE 32

TABLE VI
ON-CHIP MEMORY REQUIREMENTS OF MULTI-KEYS IN A BIN

| # of Keys | IPv4 (Real) | | | IPv4 (2M) | | | IPv6 | | |
|---|---|---|---|---|---|---|---|---|---|
| | 1 | 2 | 4 | 1 | 2 | 4 | 1 | 2 | 4 |
| Direct Lookup | 256 Kbits | 256 Kbits | 256 Kbits | 256 Kbits | 256 Kbits | 256 Kbits | 32 Kbits | 32 Kbits | 32 Kbits |
| Hash Table | 0.32 Mbits | 0.33 Mbits | 0.34 Mbits | 1.11 Mbits | 1.15 Mbits | 1.21 Mbits | 2.1 Mbits | 2.2 Mbits | 2.3 Mbits |
| Hash ID Table | 15 Kbits | 7.5 Kbits | 3.75 Kbits | 60 Kbits | 30 Kbits | 15 Kbits | 43 Kbits | 21 Kbits | 11 Kbits |
| Black Sheep Memory | 0.53 Mbits | 0.42 Mbits | 0.34 Mbits | 0.05 Mbits | 0.02 Mbits | 0 Mbits | 6 Mbits | 5.27 Mbits | 4.67Mbits |
| Total | 1.11 Mbits | 1 Mbits | 0.93 Mbits | 1.47 Mbits | 1.45 Mbits | 1.48 Mbits | 8.17 Mbits | 7.53 Mbits | 7 Mbits |
| | | -9.0% | -16.1% | | -1.4% | 0.7% | | -7.9% | -14.2% |

FIGURE 33

TABLE VII
ON-CHIP MEMORY REQUIREMENTS OF MULTIKEYS AND VERIFY BITS BYPASSING

| # of Keys | IPv4 (Real) | | | IPv4 (2M) | | | IPv6 | | |
|---|---|---|---|---|---|---|---|---|---|
| | 1 | 2 | 4 | 1 | 2 | 4 | 1 | 2 | 4 |
| Direct Lookup | 256 Kbits | 256 Kbits | 256 Kbits | 256 Kbits | 256 Kbits | 256 Kbits | 32 Kbits | 32 Kbits | 32 Kbits |
| Hash Table | 0.3 Mbits | 0.3 Mbits | 0.31 Mbits | 1.06 Mbits | 1.09 Mbits | 1.13 Mbits | 0.93 Mbits | 0.9 Mbits | 0.89 Mbits |
| Hash ID Table | 15 Kbits | 7.5 Kbits | 3.75 Kbits | 60 Kbits | 30 Kbits | 15 Kbits | 43 Kbits | 21 Kbits | 11 Kbits |
| Black Sheep Memory | 0.52 Mbits | 0.41 Mbits | 0.33 Mbits | 0.04 Mbits | 0.02 Mbits | 0 Mbits | 3.67 Mbits | 3.16 Mbits | 2.76 Mbits |
| Total | 1.08 Mbits | 0.97 Mbits | 0.9 Mbits | 1.41 Mbits | 1.38 Mbits | 1.4 Mbits | 4.67 Mbits | 4.12 Mbits | 3.69 Mbits |
| Comparison to Table VI | -2.8% | -3.4% | -3.9% | -3.5% | -4.4% | -5.3% | -42.8% | -45.3% | -47.3% |

FIGURE 34

TABLE VIII
HARDWARE RESOURCE REQUIREMENTS

|  | Slices | Slice Reg. | LUTs | LUT RAM | Block RAM/FIFO |
|---|---|---|---|---|---|
| Direct Lookup | 46 | 52 | 68 | 0 | 17 |
| MemberShip Query | 683 | 335 | 836 | 1 | 87 |
| PC-Trie Lookup | 1,677 | 1,578 | 1,615 | 109 | 2 |
| NHI Lookup | 1,457 | 1,316 | 1,325 | 75 | 2 |
| Others | 720 | 190 | 360 | 21 | 0 |
| Total | 4,583 | 3,471 | 4,204 | 206 | 108 |

FIGURE 35

UPDATING PREFIX-COMPRESSED TRIES FOR IP ROUTE LOOKUP

§0. RELATED APPLICATIONS

This application claims the benefit of U.S. Provisional Patent Application Ser. No. 61/265,397 (incorporated herein by reference and referred to as "the '397 provisional"), titled "FLASH TRIE: HASH-BASED COMPACT TRIE FOR IP ROUTE LOOKUP BEYOND 100 Gbps," filed on Dec. 1, 2009 and listing Masanori BANDO and H. Jonathan CHAO as the inventors. The present invention is not limited to requirements of the particular embodiments described in the '397 provisional.

§1. BACKGROUND OF THE INVENTION

§1.1. Field of the Invention

Embodiments consistent with the claimed invention concern Internet Protocol ("IP") networks. In particular, embodiments consistent with the claimed invention concern hash-based route lookup methods and apparatus.

§1.2. Background Information

In IP route lookup, a system (such as a router, for example) extracts each incoming packet's destination IP address and performs a longest prefix match with stored routes. Ternary content-addressable memory ("TCAM") based schemes are widely used in midrange routers. (See, e.g., the articles: F. Zane, G. Narlikar and A. Basu, "CoolCAMs: Power-Efficient TCAMs for Forwarding Engines," in *Proc. of INFOCOM*, Vol. 1, pp. 42-52, (2003); and K. Zheng, C. Hu, H. Lu and B. Liu, "A TCAM-Based Distributed Parallel IP Lookup Scheme and Performance Analysis," *IEEE/ACM Transactions on Networking*, Vol. 14, No. 4, pp. 863-875 (2006), each of which is incorporated herein by reference.) Unfortunately, however, their high cost and large power consumption make them unattractive for high-end routers such as so-called core routers.

Direct lookup schemes can use standard SRAM or DRAM to store the next hop for each prefix, in a table or multiple tables that are addressed by the prefix. However, such schemes are only effective for short address lookups (e.g., less than 16 bits), and are not practical for longer lookups due to prefix expansion. (See, e.g., the articles: P. Gupta, S. Lin and N. McKeown, "Routing Lookups in Hardware at Memory Access Speeds," in *Proc of the IEEE Computer and Communications Societies (INFOCOM* 1998), Vol. 3, pp. 1240-1247 (March/April 1998); N.-F. Huang and S.-M. Zhao, "A Novel IP-Routing Lookup Scheme and Hardware Architecture for Multigigabit Switching Routers," *IEEE Journal on Selected Areas in Comm.*, Vol. 17, No. 6, pp. 1093-1104 (June 1999); N.-F. Huang, S.-M. Zhao, J.-Y. Pan and C.-A. Su, "A Fast IP Routing Lookup Scheme for Gigabit Switching Routers," in *Proc of the IEEE Computer and Communications Societies (INFOCOM* 1999), Vol. 3, pp. 1429-1436, (March 1999); and V. Srinivasan and G. Varghese, "Fast Address Lookups using Controlled Prefix Expansion," *ACM Transactions on Computer Systems*, Vol. 17, No. 1, pp. 1-40, (1999), each of which is incorporated herein by reference.)

To avoid the prohibitively large memory requirements of direct lookup schemes due to prefix expansion, hash-based lookup schemes have been proposed. (See, e.g., the articles: S. Cadambi, S. Chakradhar, and H. Shibata, "Prefix Processing Technique for Faster IP Routing," U.S. Pat. No. 7,398,278; S. Kaxiras and G. Keramidas, "IPStash: A Set-associative Memory Approach for Efficient IP-Lookup," in *Proc. of INFOCOM*, Vol. 2, pp. 992-1001 (2005); J. Hasan, S. Cadambi, V. Jakkula and S. Chakradhar, "Chisel: A Storage-efficient, Collision-free Hash-based Network Processing Architecture," in *Proc of TSCA*, pp. 203-215 (2006); H. Song, S. Dharmapurikar, J. Turner, and J. Lockwood, "Fast Hash Table Lookup Using Extended Bloom Filter: An Aid to Network Processing," in *Proc of SIGCOMM*, pp. 181-192 (2005); S. Dharmapurikar, P. Krishnamurthy and D. E. Taylor, "Longest Prefix Matching Using Bloom Filters," *IEEE/ACM Transactions on Networking*, Vol. 14, No. 2, pp. 397-409 (2006); H. Song, F. Hao, M. Kodialam and T. Lakshman, "IPv6 Lookups using Distributed and Load Balanced Bloom Filters for 100 Gbps Core Router Line Cards," in *Proc. of INFOCOM*, pp. 2518-2526 (2009); and M. Bando, N. S. Artan, and H. J. Chao, "FlashLook: 100 Gbps Hash-Tuned Route Lookup Architecture," in *Proc. of HPSR*, 2009, each of which is incorporated herein by reference.) Whether applying a hash function to each prefix length or to a certain prefix length (e.g., /16, /24 and /32 for IPv4), those prefixes are hashed to a table. Various methods have been proposed to reduce the number of prefixes hashed to the same entry of the hash table. Bloom filters are sometimes used to query the existence of the prefix before finding the next hop information ("NHI") of the prefix.

Hardware trie-based schemes can achieve high throughput. However, they require many memory chips in parallel to accommodate the pipelined stages required by the many levels of the trie (which has a height proportional to the number of bits in the IP address). (See, e.g., the articles: W. Eatherton, G. Varghese and Z. Dittia, "Tree Bitmap: Hardware/Software IP Lookups with Incremental Updates," *ACM SIGCOMM Computer Communication Review*, Vol. 34, No. 2, pp. 97-122 (2004); S. Sikka and G. Varghese, "Memory-Efficient State Lookups with Fast Updates," in *Proc. of SIGCOMM* 2000 pp. 335-347 (2000); R. Sangireddy, N. Futamura, S. Aluru and A. K. Somani, "Scalable, Memory Efficient, High-Speed IP Lookup Algorithms," *IEEE/ACM Transactions on Networking*, Vol. 13, No. 4, pp. 802-812 (2005); H. Song, J. Turner, and J. Lockwood, "Shape Shifting Tries for Faster IP Route Lookup," in *Proc. of ICNP*, 2005; A. Basu and G. Narlikar, "Fast Incremental Updates for Pipelined Forwarding Engines," *IEEE/ACM Transactions on Networking*, Vol. 13, No. 3, pp. 690-703 (2005); and W. Jiang and V. K. Prasanna, "Multi-Terabit IP Lookup Using Parallel Bidirectional Pipelines," in *Proc. of CF*, pp. 241-250 (2008), each of which is incorporated by reference.) This is especially a problem for IPv6, which has a larger number of bits in the address.

Multibit-trie architectures, such as Tree Bitmap, have gained much attention because they can reduce the number of pipeline stages, and because of their efficient data structures. Each Tree Bitmap node contains two pieces of information: (1) an Internal Bitmap of the sub-trie and a pointer for the NHI; and (2) an External Bitmap for a head pointer to the block of child nodes and a bitmap for child sub-tries. As a result, one lookup requires multiple off-chip memory accesses. To reduce the number of off-chip memory accesses, H. Song et al. proposed Shape Shift Tries ("SST"), which allow the number of trie levels in each access to be flexible. (H. Song et al, *Proc of ICNP*, 2005) SST can achieve approximately 50% reduction in memory accesses compared to the Tree Bitmap. Although this reduction is significant, the number of memory accesses required by the SST is still considerable. In addition, SST is only suitable for sparse tries, limiting its application to future routers.

A different way to reduce memory accesses in the Tree Bitmap architecture is to increase the "stride size". The stride of an array of data refers to the number of locations in memory between successive array elements, measured in bytes or in units of the size of the array's elements. However, increasing the stride size will increase the bitmap size exponentially and result in more off-chip memory accesses, which limit system performance. Another disadvantage for choosing a large stride size is that update speed may be degraded. This is because there will be more child nodes in each trie, and they are stored in consecutive memory locations. Whenever a new child node is added, many other child nodes are moved to other memory locations. In the worst case, an entire block of child nodes is relocated.

Another typical drawback of trie-based schemes is their uneven distribution of data structures in memory. Usually in the tries, the lower level contains many more prefixes than the higher level. Each pipeline stage consists of either one level or multiple levels in the trie, and typically stores the information of its prefixes in a memory bank. As the number of prefixes differs drastically from stage to stage, the loading among memory modules is quite uneven, resulting in low memory utilization. In W. Jiang, et al, the authors proposed a solution to balance the pipeline memory. (W. Jiang, et al, *Proc. of CF,* 2008, pp. 241-250) However, their scheme uses twenty-five independent memory chips resulting in a high cost. The number of memory chips required is even more when IPv6 is to be supported.

In view of the foregoing, it would be useful to provide a route lookup system that overcomes one or more of the above-described limitations.

§2. SUMMARY OF THE INVENTION

In one exemplary embodiment consistent with present invention, a method (and apparatus) for updating stored data structures representing network forwarding information used for network route lookup, the stored data structures corresponding to a plurality of levels of sub-trie data structures of a binary tree representation of forwarding information from a routing table, each of the plurality of levels including at least one sub-trie data structure, and each of the sub-trie data structures including one or more nodes, the one or more nodes including a root node at the root of the sub-trie data structure which stores one of (1) next hop information if the root node has associated next hop information, or (2) a null value if the root node does not have associated next hop information, wherein the null value indicates that next hop information to be used for the root node of the sub-trie data structure is located in the root node of an upper level. The exemplary method includes (1) receiving information about a new route to be included as forwarding information in the sub-trie data structures, wherein the information about the new route includes an address prefix and an address length, (2) identifying, by the forwarding device and using the received address prefix and address length, a node in a destination sub-trie data structure to which the new route forwarding information will be stored in, (3) storing, by the forwarding device, the new route forwarding information in the identified node, wherein the identified node is located in a first sub-trie at a first level; and (4) updating, by the forwarding device, the root node of any sub-trie data structures that are descendants of the identified node, and that are located at a second level which is one level below the first level which includes the identified node, with the new route forwarding information.

In another embodiment consistent with present invention, a method (and apparatus) for updating stored data structures representing network forwarding information used for network route lookup is presented. The method includes (1) receiving, by a forwarding device, information about a route to be deleted from the sub-trie data structures, wherein the information about the route includes an address prefix and an address length, (2) identifying, by the forwarding device and using the received address prefix and address length, a node in a destination sub-trie data structure which stores the information about a route to be deleted, (3) deleting, by the forwarding device, the route information from the identified node, and (4) updating, by the forwarding device, the root node of any sub-trie data structures that are descendants of the identified node, and that are located at a second level which is one level below the first level which includes the identified node, with the deleted route information.

§3. BRIEF DESCRIPTION OF THE DRAWINGS

FIG. 1 illustrates an overview of an exemplary FlashTrie architecture with an example routing table which may be used in exemplary embodiments consistent with the present invention.

FIG. 2 includes FIGS. 2A and 2B and illustrates a bitmap transformation from Binary-Trie to (a) Tree Bitmap, (b) Prefix-Compressed Trie 2, and (c) Prefix-Compressed Trie 4, in accordance with at least one exemplary embodiment consistent with the present invention.

Figures 7, 7A:
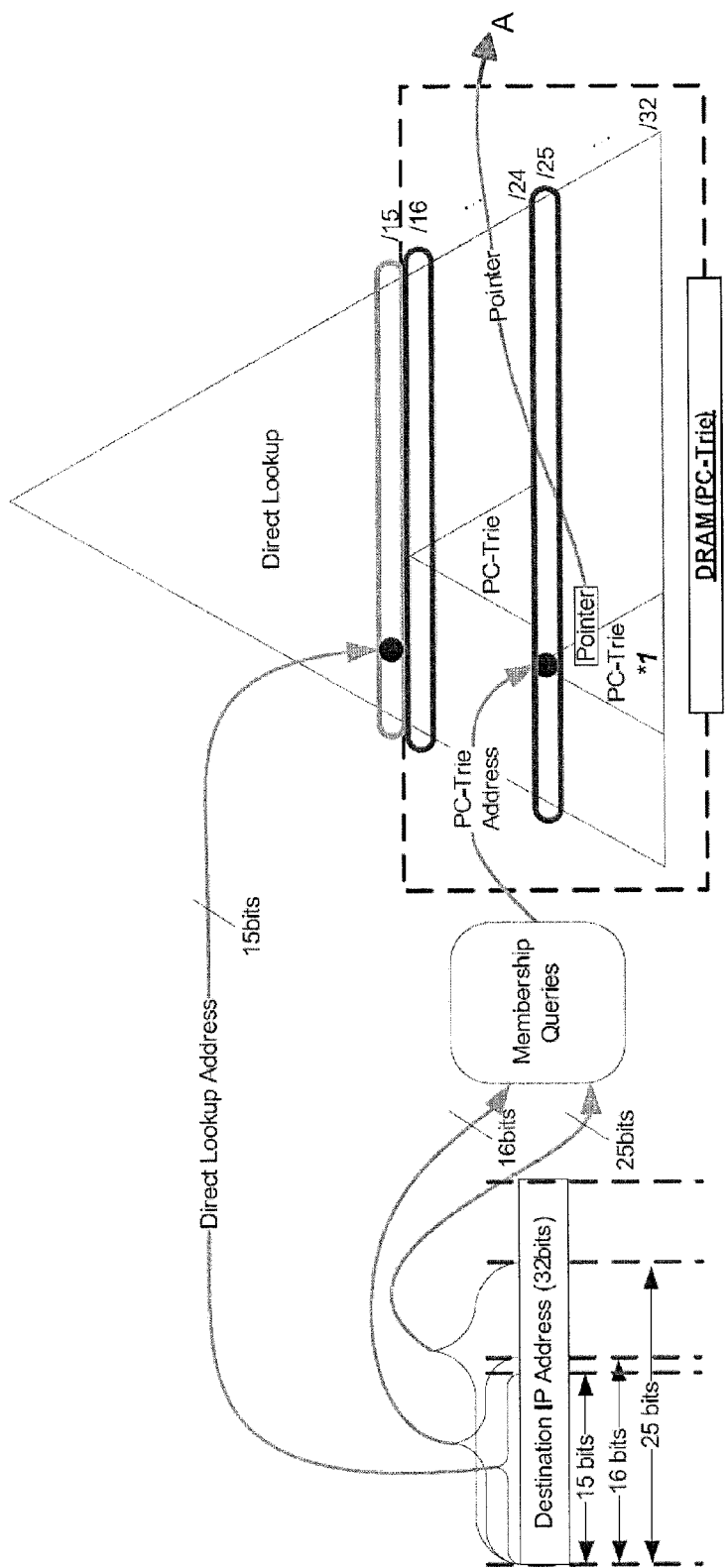
Figure 7B:
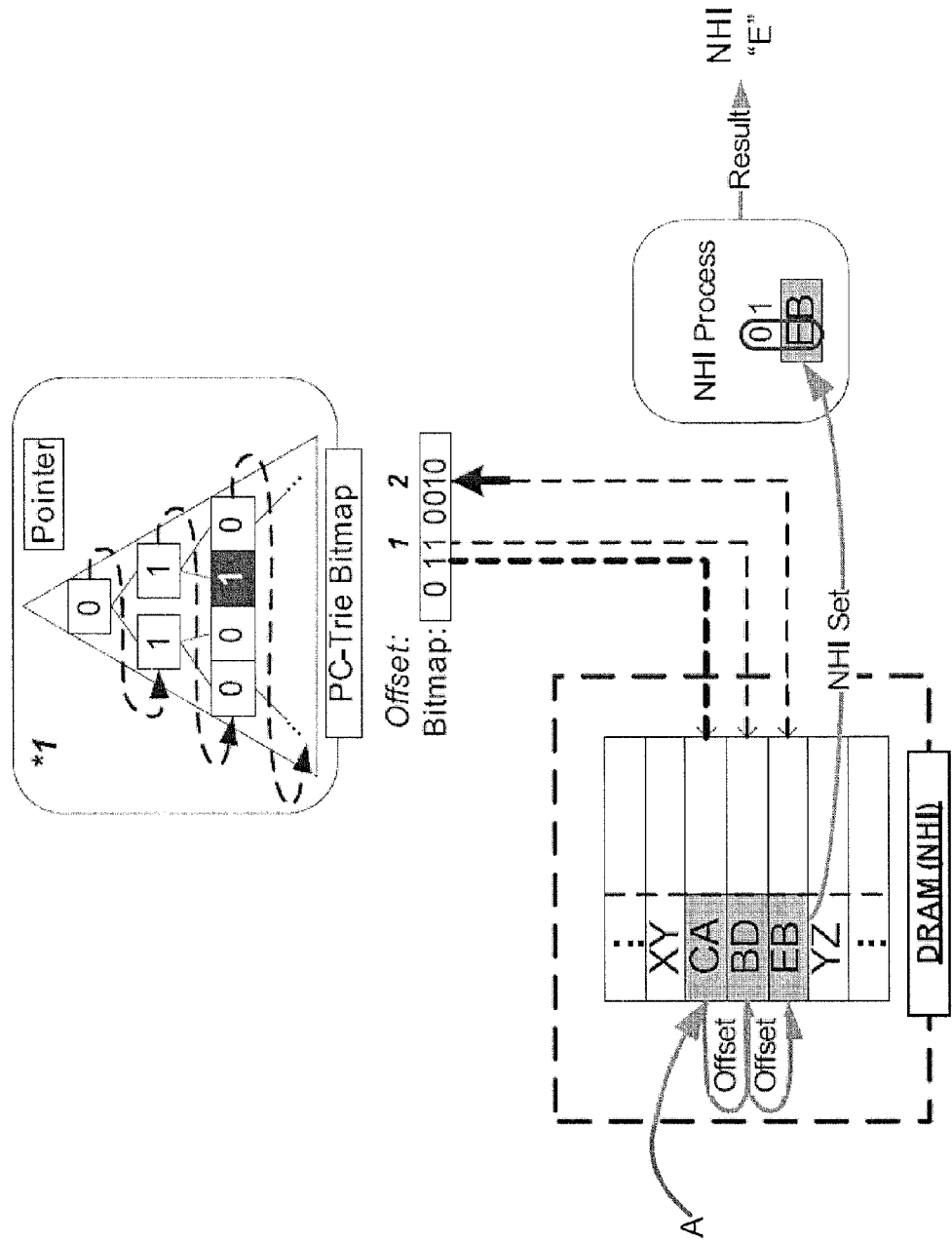

FIG. 7 includes FIGS. 7A and 7B and illustrates an architecture and lookup operation in accordance with at least one exemplary embodiment consistent with the present invention.

Figure 8:
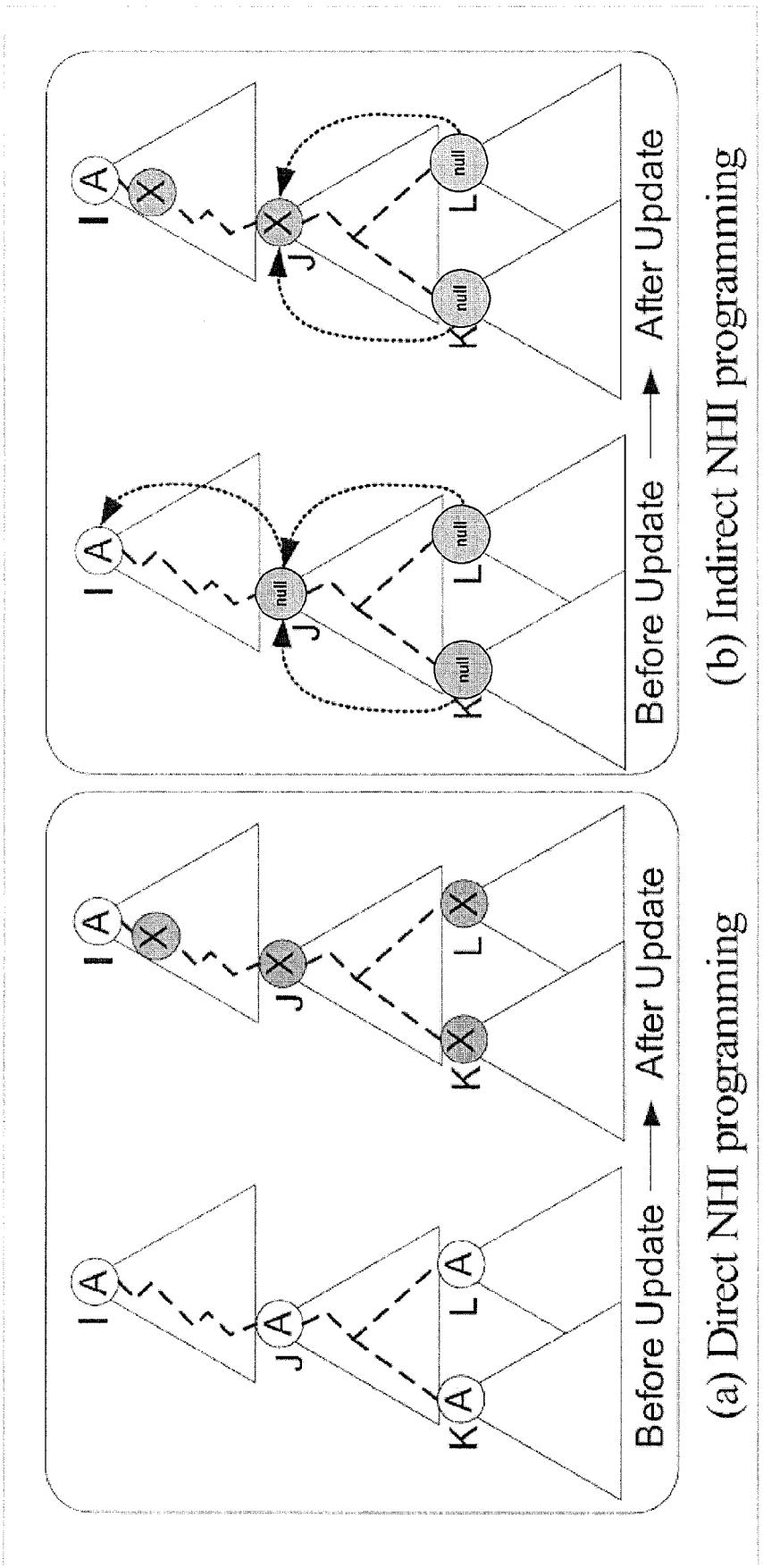

FIG. 8 illustrates an on-chip memory update for (a) Direct NHI Programming, and (b) Indirect NHI Programming in accordance with at least one exemplary embodiment consistent with the present invention.

Figure 9:
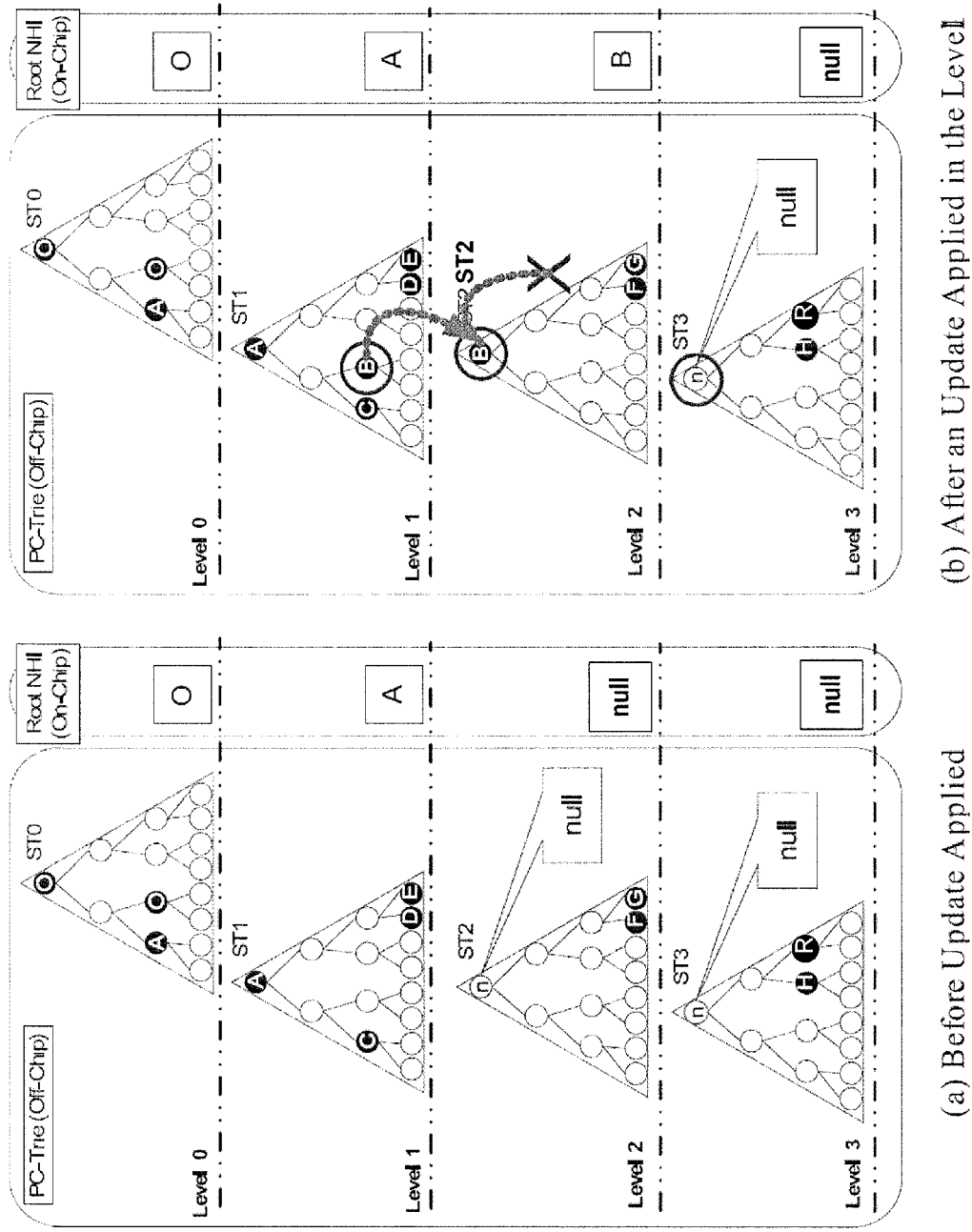

FIG. 9 illustrates an on-chip memory update detail (a) before an update is applied, and (b) after an update is applied in Level 1 in accordance with at least one exemplary embodiment consistent with the present invention.

Figure 10:
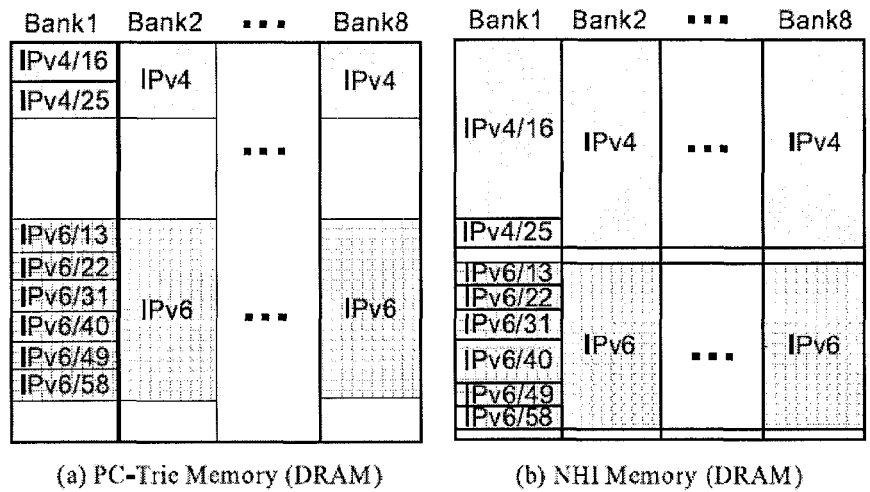

FIG. 10 illustrates a DRAM memory data allocation in accordance with at least one exemplary embodiment consistent with the present invention.

Figure 11:
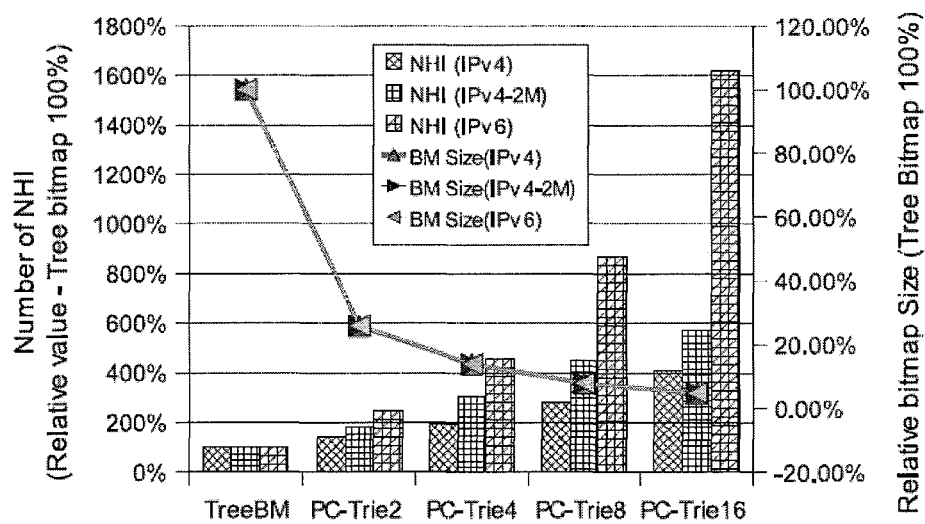

FIG. 11 illustrates off-chip memory requirements of Tree-Bitmap versus a FlashTrie architecture consistent with the present invention.

Figures 12, 12A:
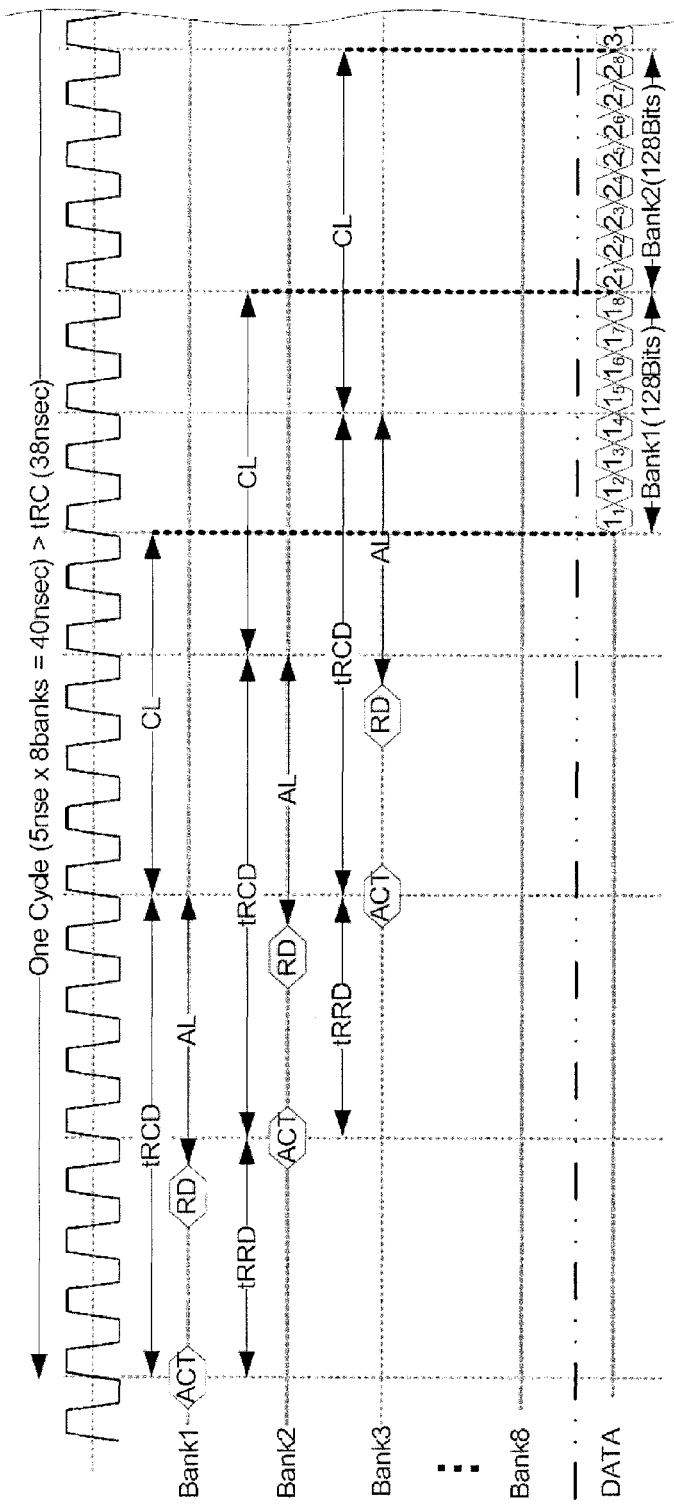
Figure 12B:
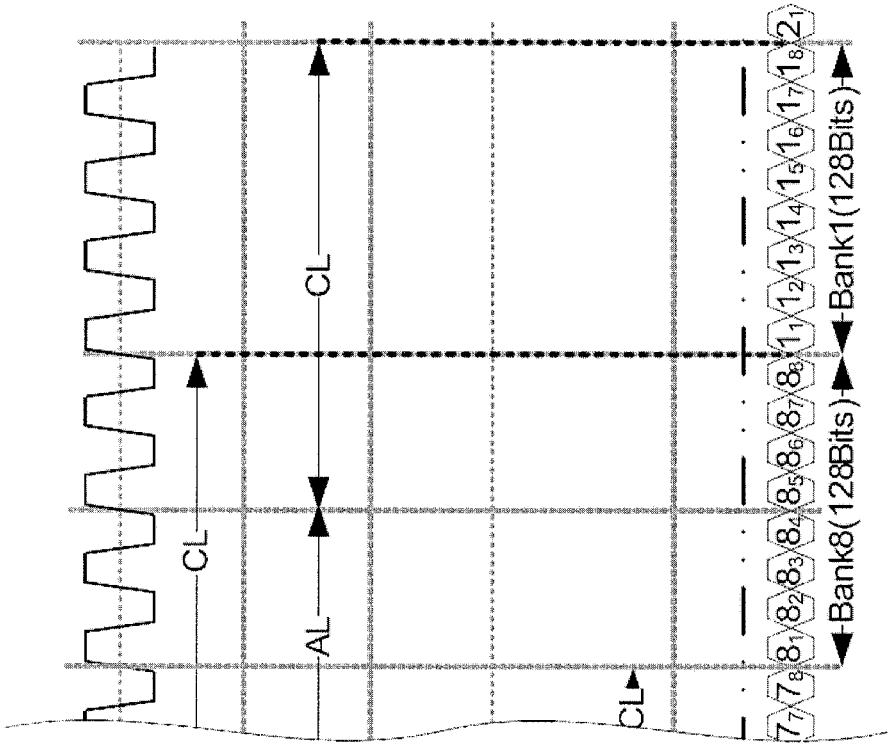

FIG. 12 includes FIGS. 12A and 12B and illustrates a DRAM memory access timing diagram.

Figure 13:
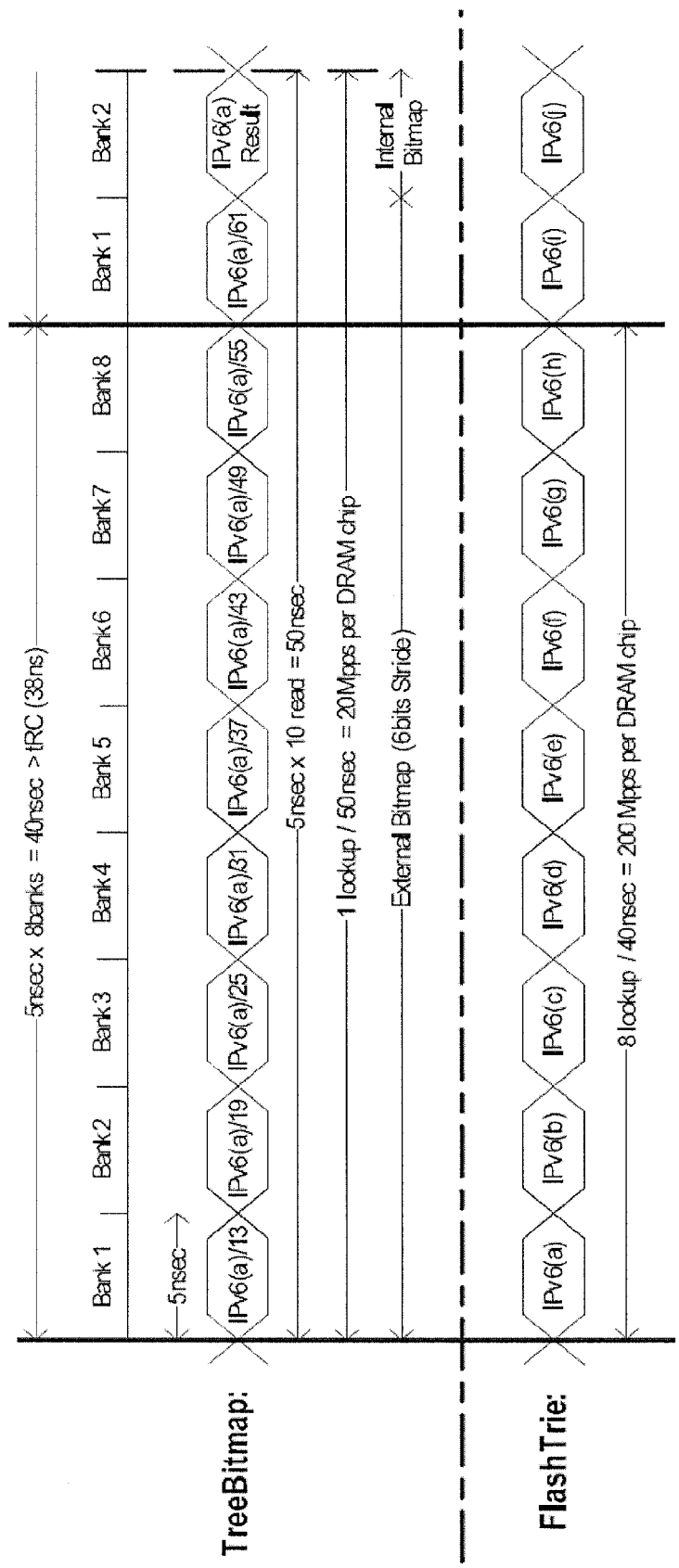

FIG. 13 illustrates a DRAM memory access timing diagram for Tree Bitmap versus a FlashTrie architecture consistent with the present invention.

Figure 14:
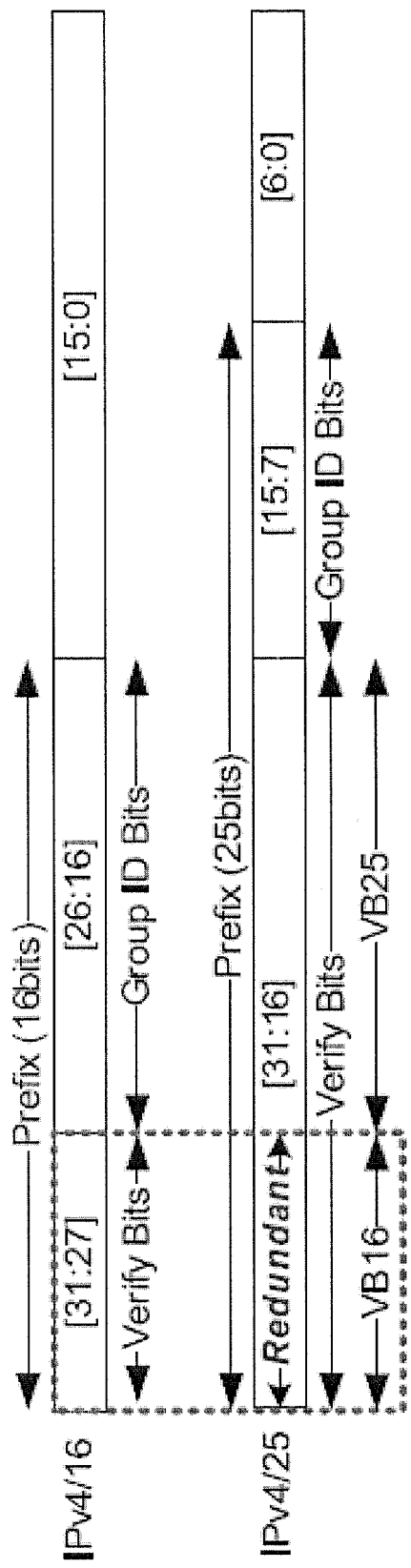

FIG. 14 illustrates an exemplary incremental verify bits optimization consistent with the present invention.

Figure 15:
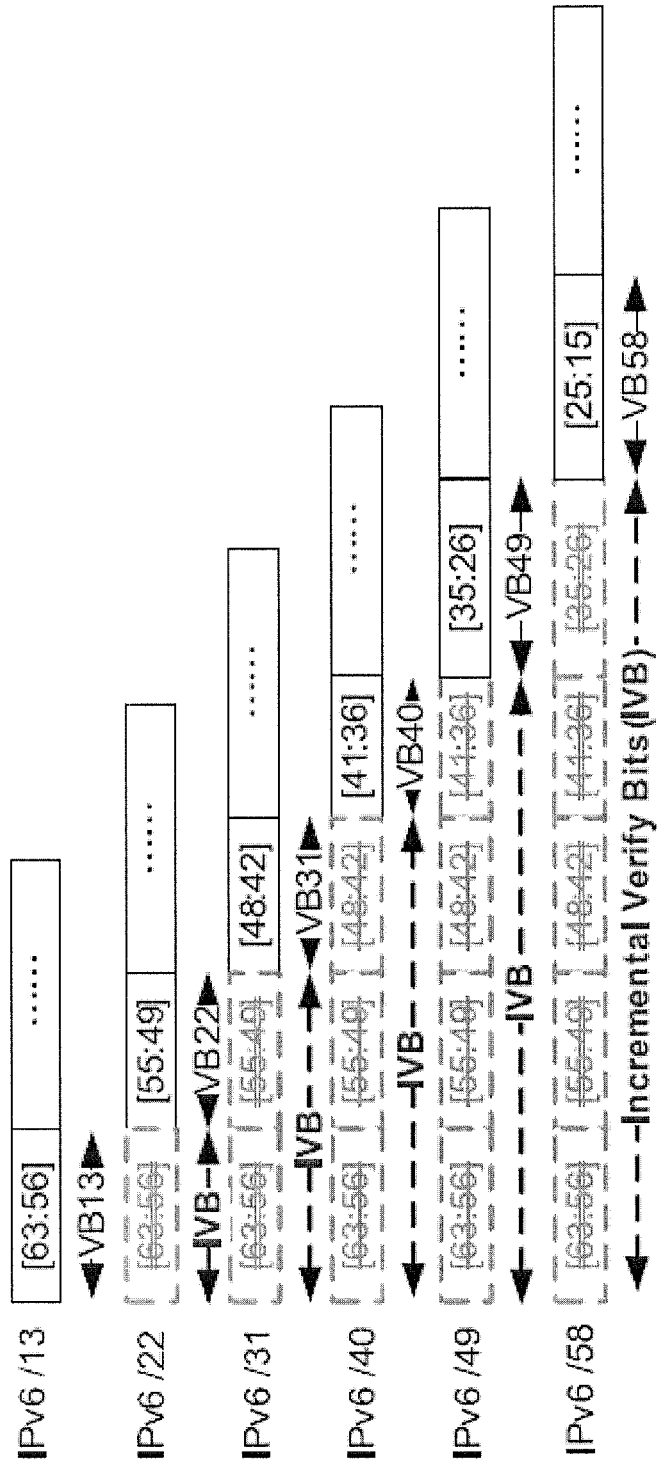

FIG. 15 illustrates an exemplary incremental verify bits optimization for IPV6 consistent with the present invention.

Figure 16:
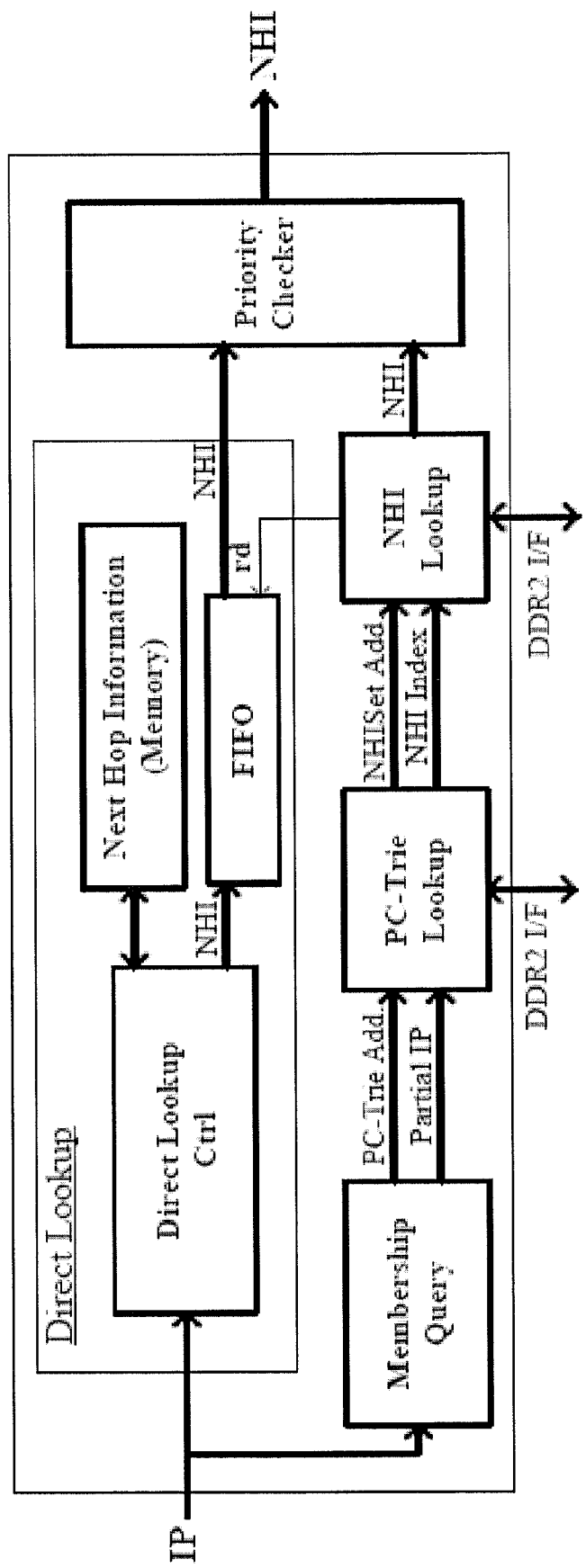

FIG. 16 is hardware block diagram of an exemplary embodiment consistent with the present invention.

Figure 17:
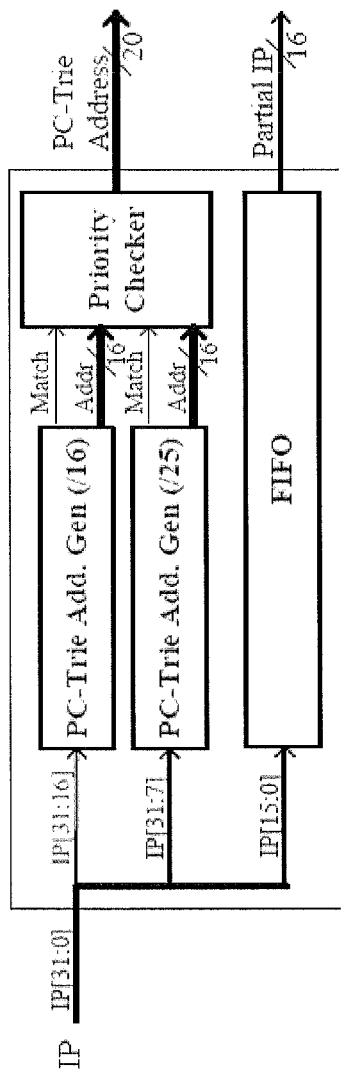

FIG. 17 illustrates an exemplary membership query module consistent with the present invention.

Figure 18:
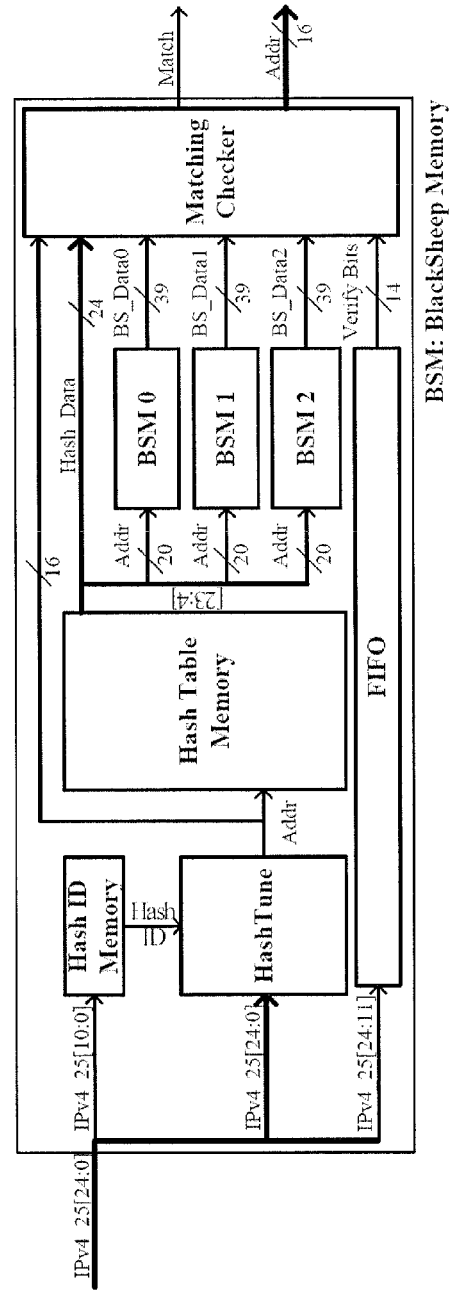

FIG. 18 illustrates details of an exemplary PC-Trie address generator consistent with the present invention.

Figure 19:
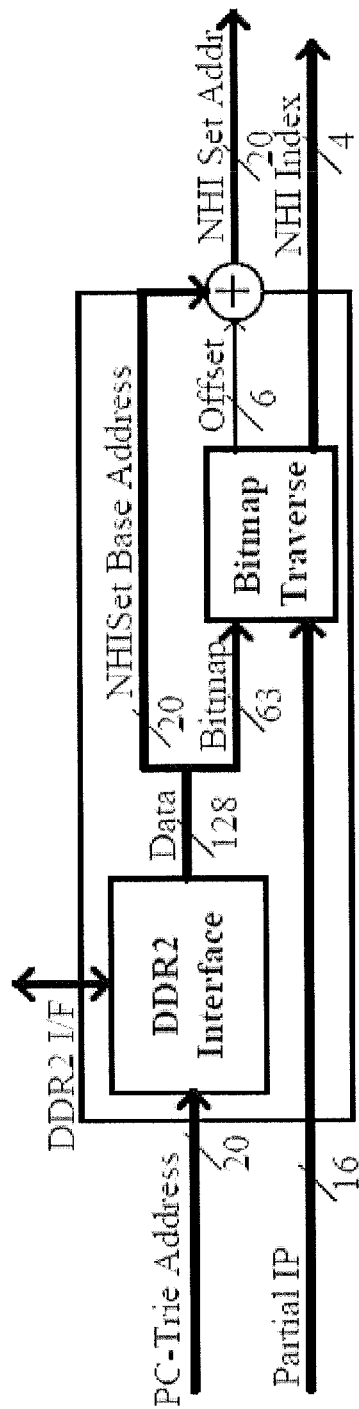

FIG. 19 illustrates a block diagram of an exemplary PC-Trie processing unit consistent with the present invention.

Figure 20:
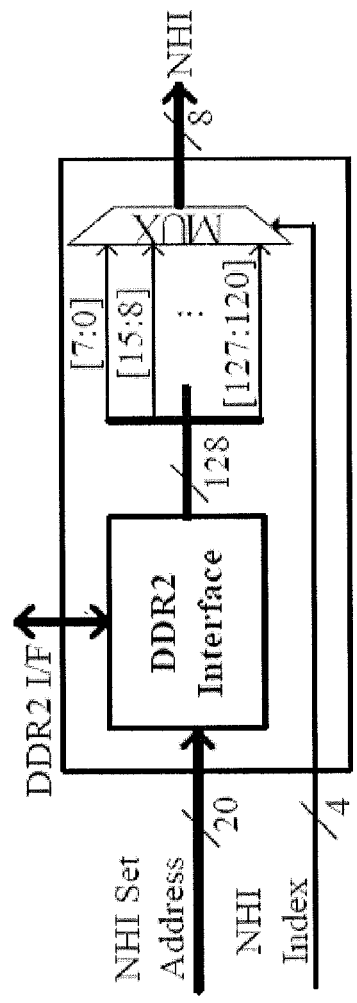

FIG. 20 is a block diagram of an exemplar NHI processing unit consistent with the present invention.

Figure 21:
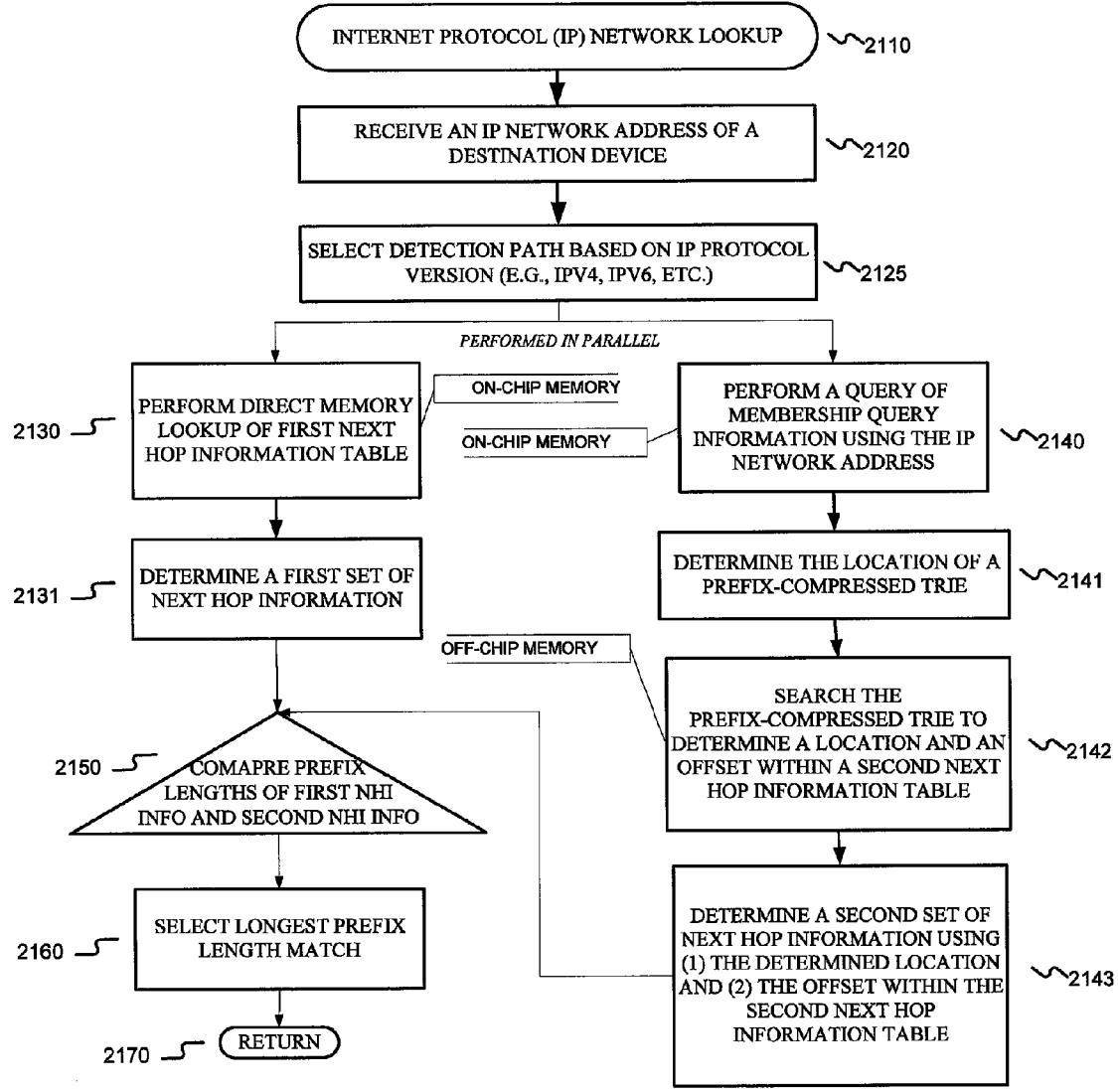

FIG. 21 is a flow diagram of an exemplary Internet Protocol (IP) network lookup method consistent with the present invention.

Figure 22:
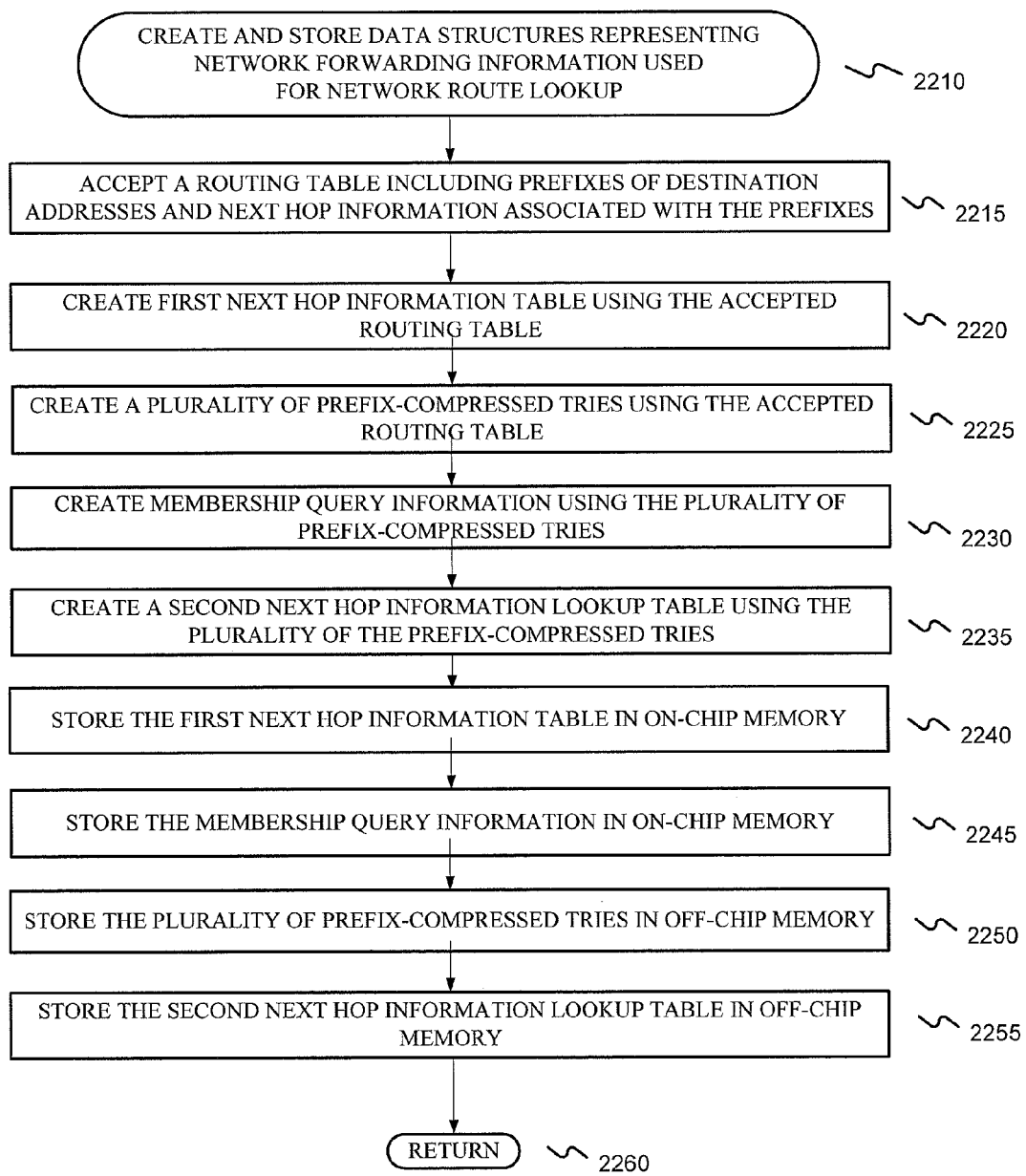

FIG. 22 is a flow diagram of an exemplary method for creating and storing data structures representing network forwarding information used for network route lookup consistent with the present invention.

Figure 23:
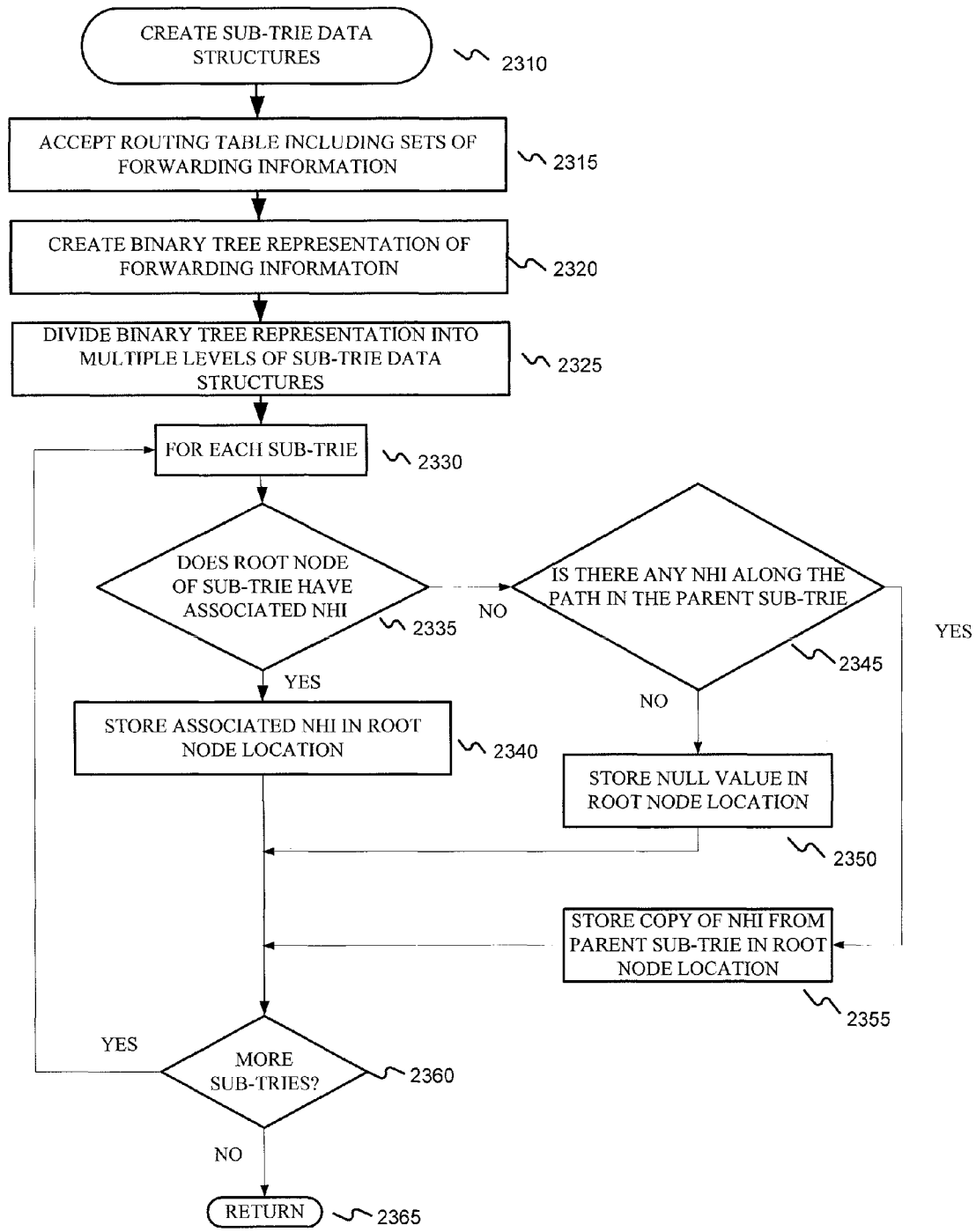

FIG. 23 is a flow diagram of an exemplary method for creating and storing data structures representing network forwarding information used for network route lookup consistent with the present invention.

Figure 24:
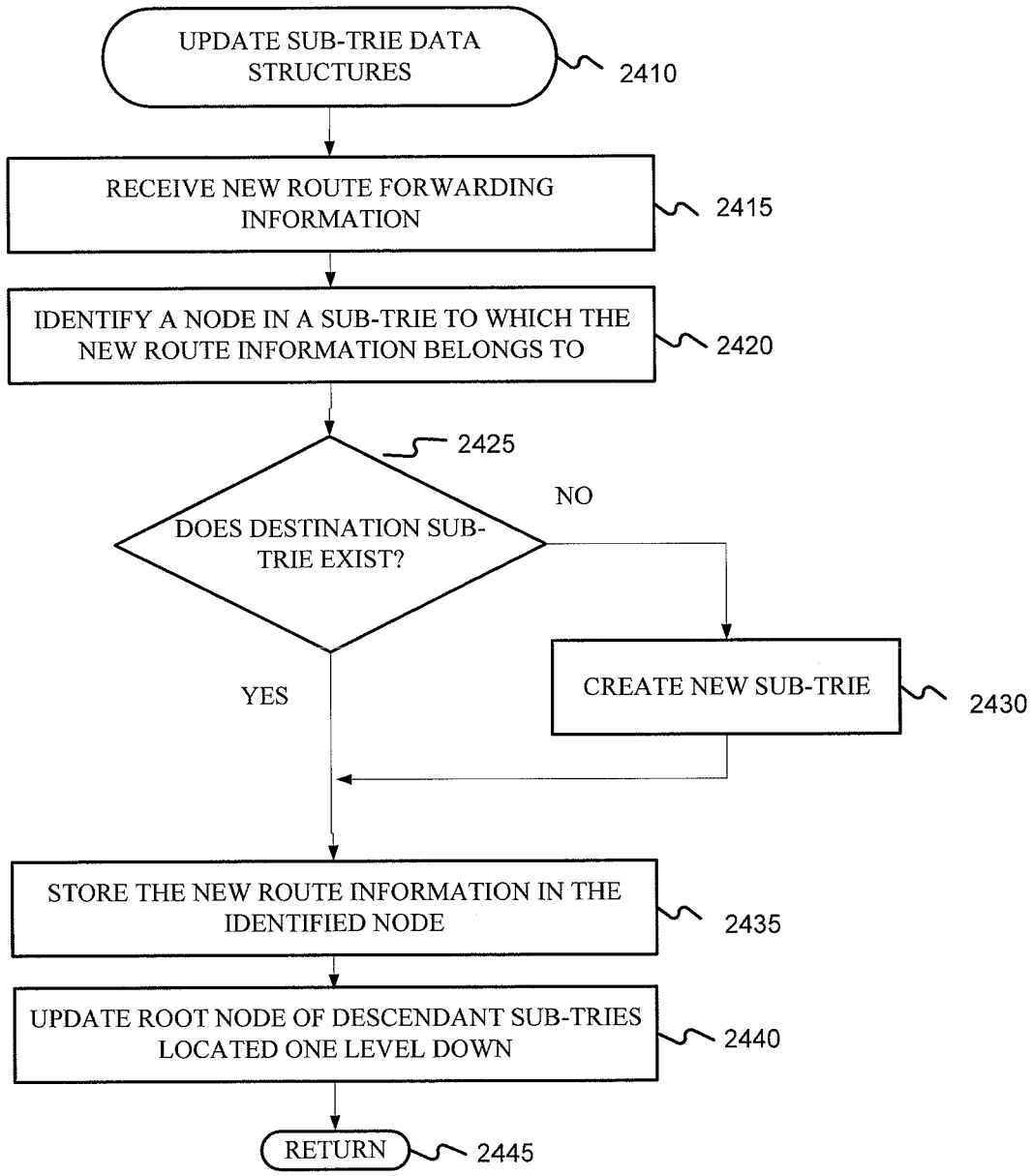

FIG. 24 is a flow diagram of a first exemplary method for updating data structures representing network forwarding information used for network route lookup consistent with the present invention.

Figure 25:
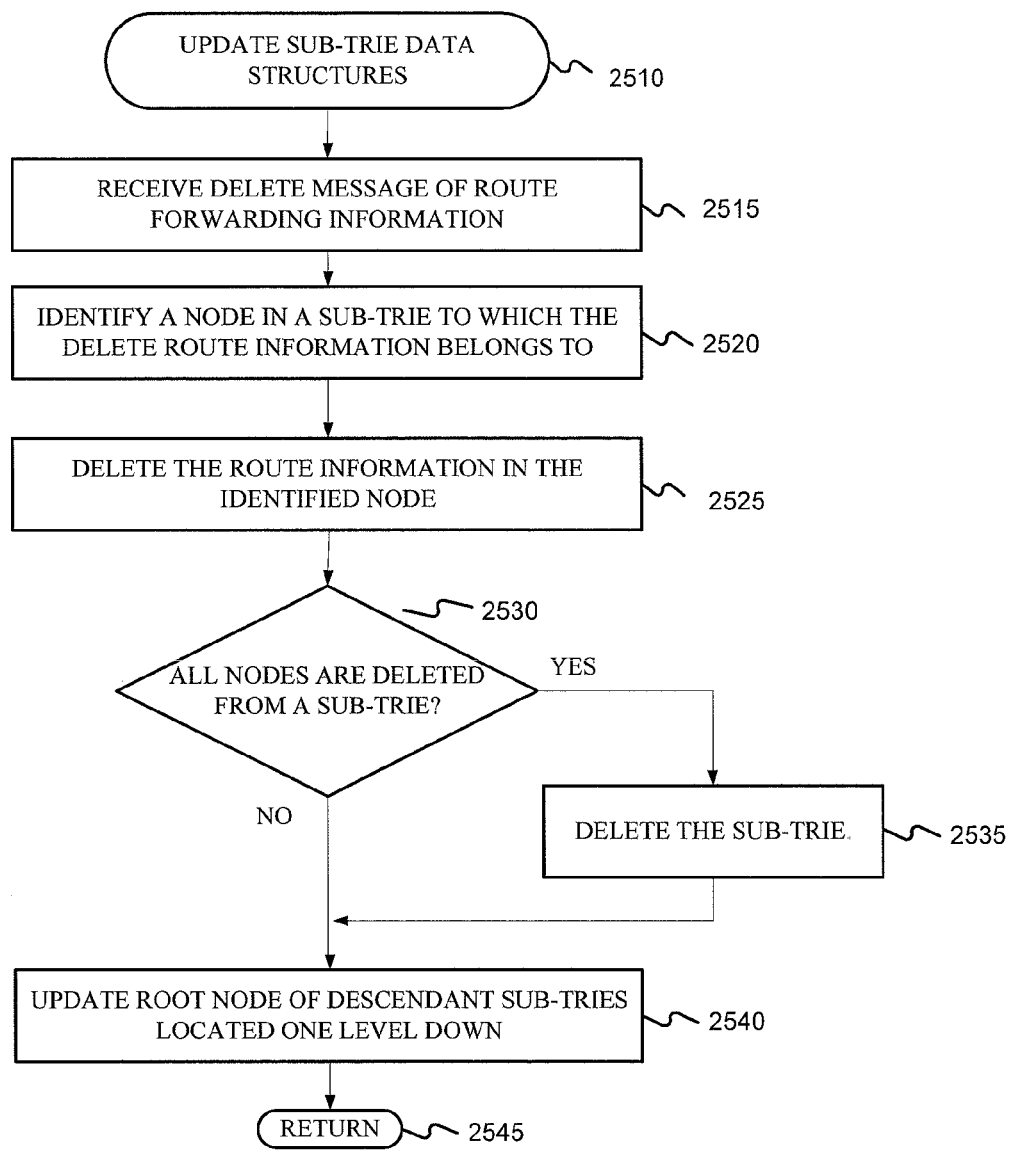

FIG. 25 is a flow diagram of a second exemplary method for updating data structures representing network forwarding information used for network route lookup consistent with the present invention.

Figure 26:
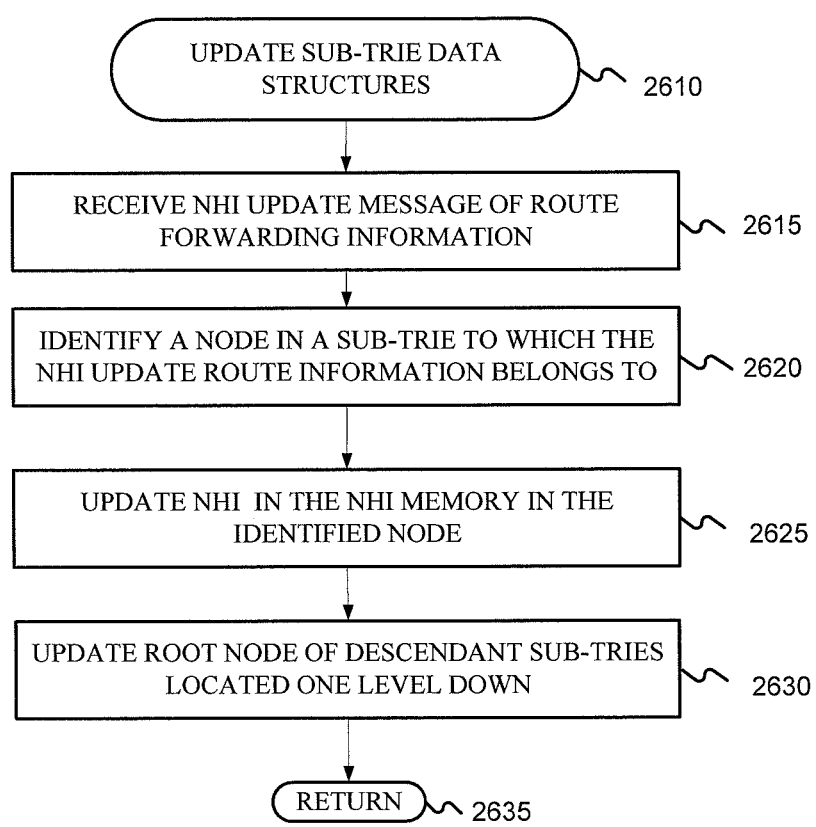

FIG. 26 is a flow diagram of a third exemplary method for updating data structures representing network forwarding information used for network route lookup consistent with the present invention.

Figure 27:
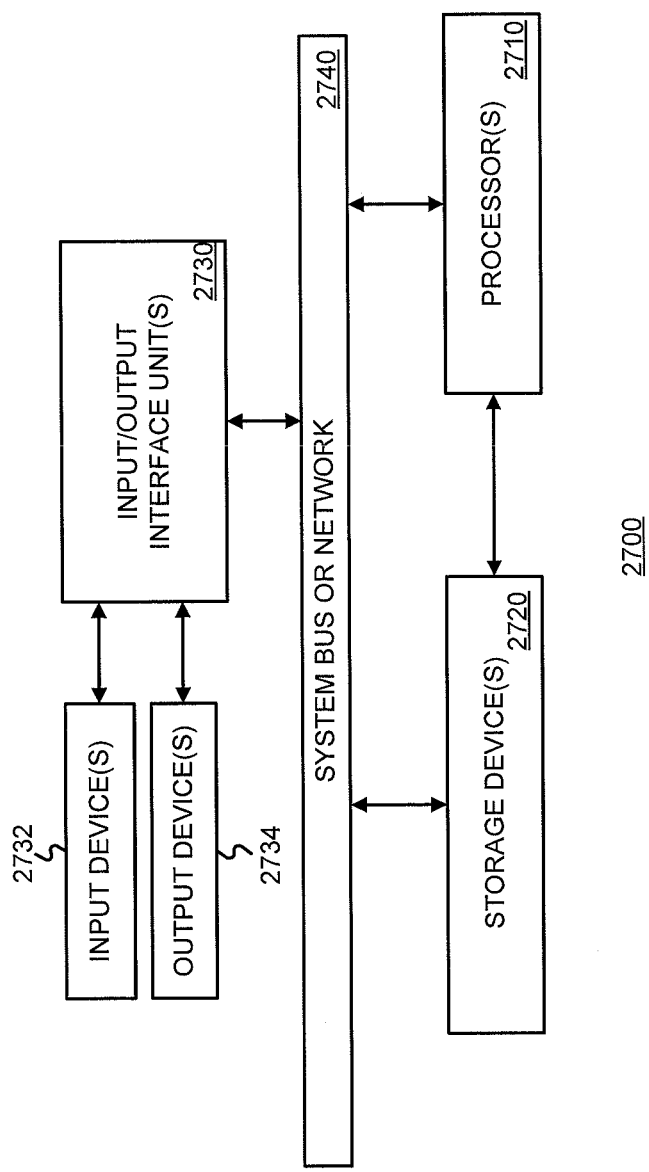

FIG. 27 is a block diagram of an exemplary apparatus that may be used to practice at least some aspects of the invention.

FIG. 28 presents Table I, which includes the number of sub-tries in each level and the total sub-tries for the three routing tables used in discussing the performance evaluation of an exemplary embodiment consistent with the present invention.

FIG. 29 presents Table II, which includes on-chip memory requirements for: (1) storing information required for direct lookup for up to /15(IPv4) or /12(IPv6), (2) storing hash tables used for membership queries, (3) storing a hash ID table (storing a hash ID for each group), and (4) Black Sheep memories for storing collided items in the hash table.

FIG. 30 presents Table III, which summarizes the on-chip memory configurations for the determined number of groups and bins in each group, which were determined from simulation results during performance evaluation of an exemplary embodiment consistent with the present invention.

FIG. 31 presents Table IV, which summarizes PC-Trie bitmap off-chip memory requirements compared with Tree Bitmap memory requirements.

FIG. 32 presents Table V, which summarizes Next Hop Information (NHI) off-chip memory requirements compared with Tree Bitmap memory requirements.

FIG. 33 presents Table VI, which summarizes on-chip memory requirements of using multiple keys per bin.

FIG. 34 presents Table VII, which summarizes on-chip memory requirements of multi-keys and verify bits bypassing.

FIG. 35 presents Table VIII, which summarizes hardware resource requirements of an exemplary embodiment consistent with the present invention.

§4. DETAILED DESCRIPTION

Embodiments consistent with the claimed invention may involve novel methods, apparatus, message formats, and/or data structures for providing low-cost, high-speed, next generation route lookup architecture that can support two million (2M) IPv4, and 318 thousand (318K) IPv6, routes simultaneously. The following description is presented to enable one skilled in the art to make and use the invention, and is provided in the context of particular applications and their requirements. Thus, the following description of embodiments consistent with the claimed invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

§4.1 Flashtrie Overview

Figure 1:
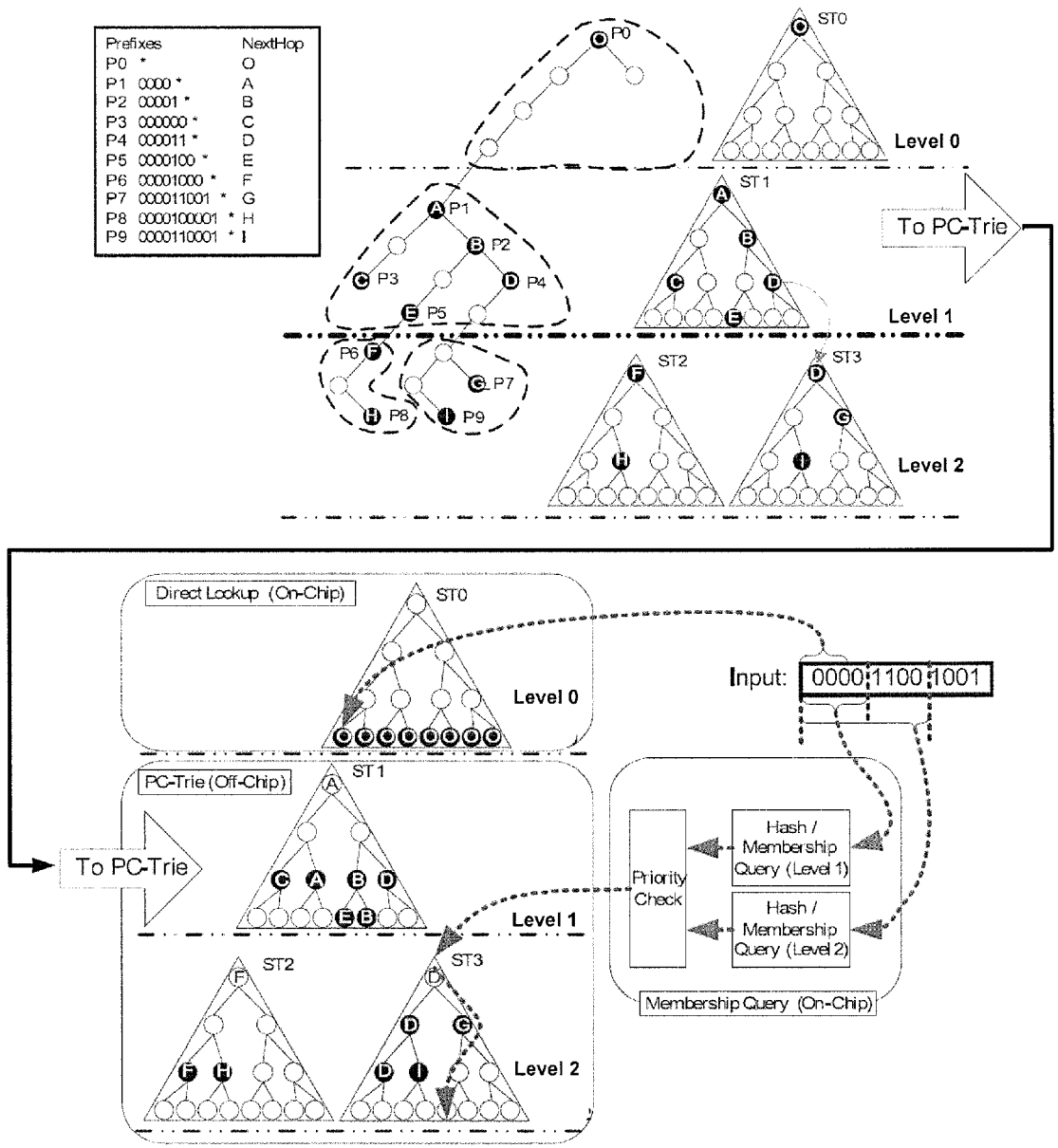

An overview of an exemplary FlashTrie architecture, with an exemplary routing table, is shown in FIG. 1. The routing table has ten (10) routes for which corresponding prefixes and next hop information ("NHI") are shown in the table. The binary trie for this routing table is constructed next to the routing table. The binary trie is divided into different "levels" based on these k-bit sub-tries (k=4 in this example). Thus, Level 0 contains prefixes of prefix length 0 to prefix length 3, Level 1 contains prefixes of prefix length 4 to prefix length 7, and so on. Each level contains one or more sub-tries.

All sub-tries should be independent among different levels in the FlashTrie architecture so that off-chip memory access is reduced (e.g., such that only one is needed). For example, in FIG. 1, the sub-trie that contains prefixes P7 and P9 does not have NHI in the root node. This means, empty nodes (e.g., nodes that are not related to P7 and P9) in this sub-trie depend on the node present one level up (P4 in the example). To remove this dependency, the NHI of P4 is copied to the root of the sub-trie (ST3) illustrated as an arrow.

The sub-tries are converted to a new compressed trie called "Prefix-Compressed Trie" (or "PC-Trie"), described in §4.1.1 below, which is then stored in off-chip memory. In the actual system, all root nodes may be stored in on-chip memory, which facilitates easy updating. The top level (Level 0) uses a direct lookup approach, so ST0 is not a PC-Trie and is stored in on-chip memory.

One advantage of the exemplary FlashTrie architecture is that it uses only one off-chip memory access to resolve IPv4/IPv6 trie. To ensure only one off-chip memory access, lightweight, on-chip hash modules are deployed to perform membership queries. An optimized hash data structure, called HashTune (described in M. Bando, N. S. Artan, and H. J. Chao, "FlashLook: 100 Gbps Hash-Tuned Route Lookup Architecture," in *Proc. of HPSR*, 2009, which is incorporated by reference), may be used for the hash function. An exemplary hash data structure is discussed in §4.1.2 below.

The hash tables are queried to find the existence of a sub-trie at each level in parallel. Since there are multiple levels, there could be matches in more than one level at a time. This is resolved based on prioritizing the matches such that the longest prefix has the highest priority. Thus, only the longest matching sub-trie is accessed from off-chip memory. The number of off-chip memory accesses is limited by this on-chip membership operation. This operation is illustrated on the right side of FIG. 1. Section 4.1.1 explains an exemplary compressed data structure Prefix-Compressed Trie (PC-Trie) and exemplary membership query operations.

§4.1.1 Exemplary Prefix-Compressed Trie

The number of memory accesses per lookup (ideally, one memory access) is also controlled by managing bitmap size. Current DRAMs have, at most, a 16-bit data bus and a burst size of 8, so one DRAM access can read or write, at most, 128 bits. Thus, any bitmap size exceeding 128 bits requires multiple memory accesses to a current DRAM. This significantly degrades lookup performance (speed). In Tree Bitmap, the internal bitmap has ($2^{stride}-1$) bits and the external bitmap consumes $2^{stride}$ bits. Thus, the 9-bit stride size requires more than 1 k bits, which requires multiple off-chip memory accesses. The Tree Bitmap scheme does not involve any bitmap compression technique. Hence, the bitmap size increases exponentially. Although the Tree Bitmap scheme proposes two optimizations—split tree bitmap and segmented bitmap—they are not sufficient. Using split tree bitmap, the internal and external bitmaps are stored in separate memories. This way, the Tree Bitmap node is reduced to nearly half the actual size. Still, one bitmap size is too big to be fetched from an off-chip memory access. With segmented bitmap, the original bitmap is cut in half each time it is segmented. However, each segmented node must have a pointer, which eventually creates considerable overhead. As a result, segmented bitmap optimization actually increases the total memory requirement. These two optimizations, as well as other Tree Bitmap types of data structures, suffer from the same problem.

Figure 2A:
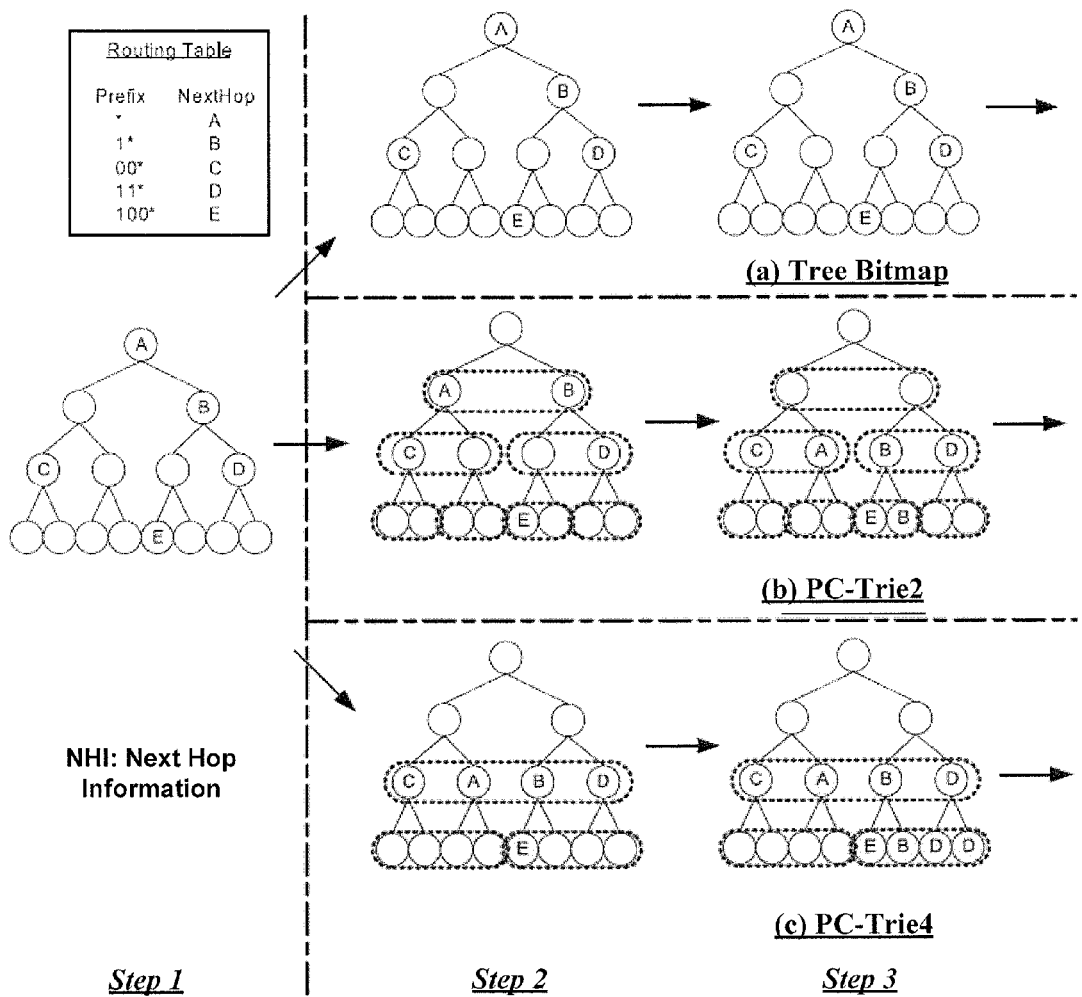
Figure 2:
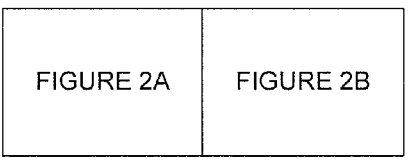

To overcome these problems, the PC-Trie data structure is proposed as illustrated in FIG. 2. The main difference between Tree Bitmap and the PC-Trie data structure is that a bit in the Tree Bitmap represents only one node, while a bit in a PC-Trie represents more than one node. More specifically, one bit of the PC-Trie can represent consecutive nodes (called "siblings") in the same prefix length.

Figure 2B:
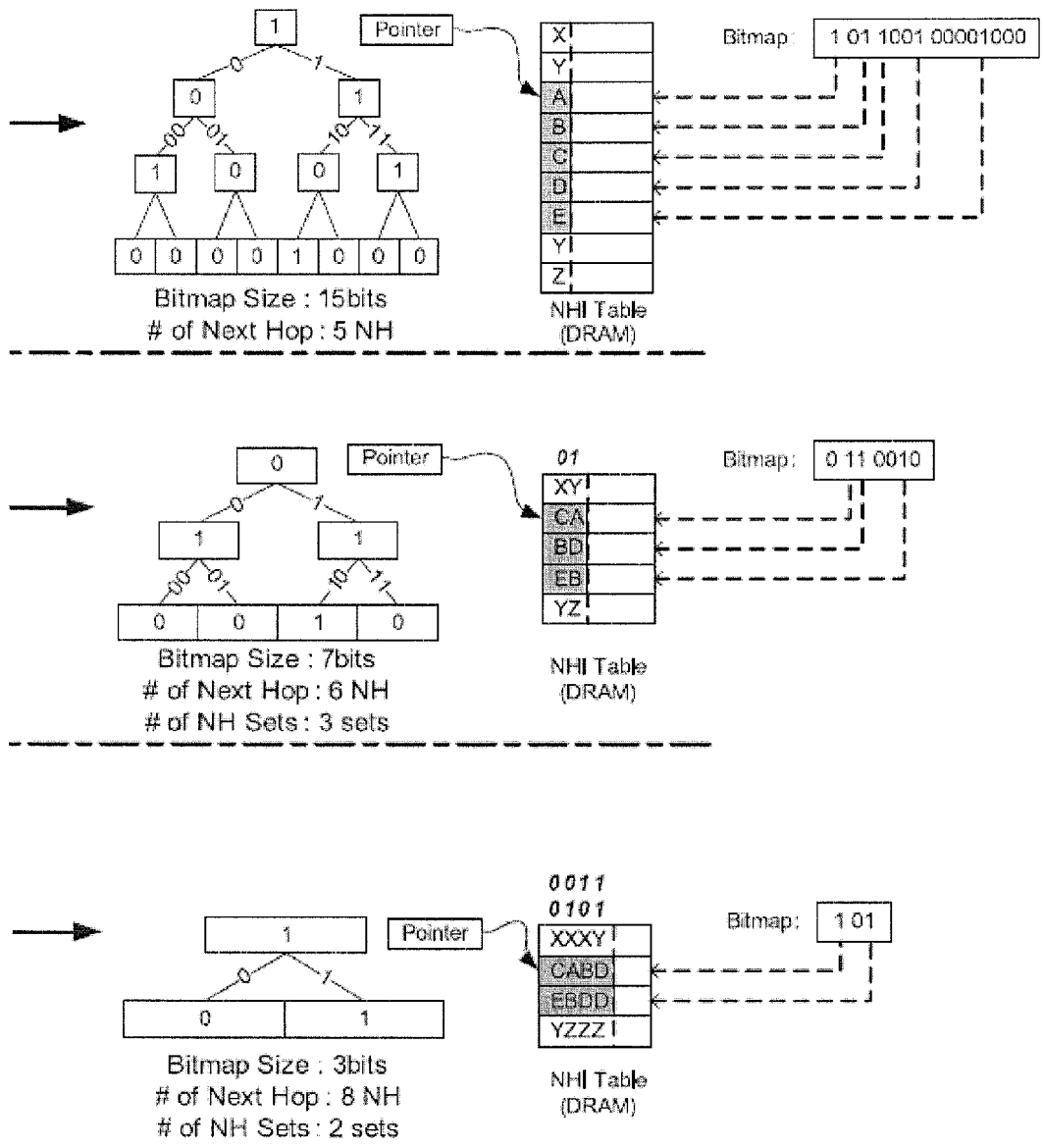

The example in FIG. 2 shows one sub-trie that includes five prefixes (*, 1*, 00*, 11*, 100*) and the corresponding NHI (A, B, C, D, E). In Step 1 of FIG. 2, the routing table is simply translated into a binary trie representation. FIG. 2(a) shows Tree Bitmap for the given routing table. Since Tree Bitmap simply converts the binary trie representation to the bitmap representation, Step 2 and Step 3 of FIG. 2 are the same as in the binary trie. Bit positions in the bitmap are set to "1" at the locations that have a prefix, and set to "0" otherwise, as shown in the Final Data Structure in FIG. 2. PC-Trie2 in FIG. 2(b) illustrates the conversion process from a binary trie to PC-Trie2. The suffix (i.e., the number) represents the compression degree. PC-Trie2 means the compression of two sibling nodes into one. The two sibling bits that are compressed are marked by a dotted circle. This set of nodes is denoted as a node set.

Construction of the PC-Trie has two rules: (1) all sibling nodes must be filled with NHI if at least one node in the node set contains NHI; and (2) the parents node set can be deleted if all child node sets exist. The first rule requires that if the sibling is not present, NHIs are copied and filled with either the parent's or the ancestor's NHI. (See for example, the PC-Trie in Step 2 of FIG. 2.) Prefixes C, D, and E are the only children with an empty sibling. The empty siblings of C, D, and E need to be filled with their respective parent's or ancestor's NHI. In the example shown in FIG. 2, A is the parent of empty sibling C, and B is the parent of empty sibling D and the grandparent of empty sibling E. Thus, Step 3 of FIG. 2 shows all the empty siblings filled with their respective parent's or ancestor's NHI. Applying the second rule, a node set that contains A and B can be eliminated. In the Final Data Structure step, the bitmap is constructed from the PC-Trie.

Only one bit is required to represent two nodes. As a result, the bitmap size is reduced from 15 bits to 7 bits (a reduction of more than half). Similarly, a higher degree of compression can be achieved to further reduce the bitmap size. The bitmap size for the n degree of compression can be formulated as PC-Trie $n=2^{(s-\log 2(n)-1)}$ bits where s is the stride size (in bits). Thus, for a PC-Trie 8 and 9-bit stride (n=8, s=9), the PC-Trie requires 63 bits as compared to 511 bits for the Tree Bitmap. Construction procedures of PC-Trie4 (i.e., the compression of four sibling nodes into one) are also illustrated in FIG. 2(c).

Although FIG. 2 shows that NHI may need to be duplicated (for example, six NHIs are needed for the compressed PC-Trie2, while the original number of NHIs is five), the number of memory slots needed for the NHI table is reduced. For example, as shown in FIG. 2, Tree Bitmap needs five slots while PC-Trie2 needs only three. The size of an NHI is so small (e.g. 8 bits) that multiple NHIs can be stored into a single memory slot. A single DRAM read (e.g., 128 bits) for a memory slot effectively fetches multiple NHIs. This not only results in a more compact memory footprint, but more importantly, the number of memory accesses required is the same as that before compression, if not fewer. Both IPv4 and IPv6 NHI can simultaneously be fit in one bank of a DRAM chip after compressing the bitmap. A high compression rate is also available in PC-Trie. Algorithm 1 shows pseudo-code to construct a PC-Trie as explained above.

---

Algorithm 1 Prefix-Compressed Trie Construction

---

1: Prefix-Compressed Trie (SubTrie[ ], stride, compSize)
2: //All Sub-Tries
3: for (i=0 to SubTrie.Length; i++) do
4:   //All PC-Trie node
5:   for (s=compSize-1 to $2^{Stride}$; s=s+compSize) do
6:     //All nodes in a PC-Trie node
7:     for (t=s to s+compSize-1; t++) do
8:       if (At least one prefix exist in an CompNode) then
9:         [Fill the PC-Trie node with proper NHI]
10:       end if
11:     end for
12:   end for
13:   //Eliminate Redundancy
14:   for (ns=0 to ns=compSize: ns++) do
15:     if (A PC-Trie node has both child PC-Trie nodes.) then
16:       [Remove the PC-Trie node.]
17:     end if
18:   end for
19: end for

---

§4.1.2 Membership Queries

As mentioned above, one of the features of the exemplary FlashTrie data structure is that only one off-chip memory access for an IPv4/IPv6 trie is required. To ensure this, each off-chip memory access must return the intended PC-Trie for the queried input IP address. Otherwise, additional memory accesses would be required to determine the longest matching prefix in the upper level of the sub-trie. FlashTrie performs on-chip membership queries to achieve this. The most popular architecture to perform membership queries is the bloom filter. (See, e.g., B. Bloom, "Space/Time Trade-offs in Hash Coding with Allowable Errors," *Communications of the ACM*, Vol. 13, No. 7 (1970), which is incorporated by reference.) The most recognized advantage of the bloom filter is that the result is free from false negatives.

However, the result still contains false positives. False positives can be reduced by increasing the number of hash functions per lookup, the size of the hash table, or both. Achieving a lower false-positive rate requires a considerable amount of resources and many parallel hash functions that increase system complexity and downgrade system performance. Even after all the effort, the false-positive rate will still not converge at zero. This issue is solved by using an exact match operation along with a hash function. Each entry of the hash table holds all or a portion of the root IP address of the programmed sub-trie. This entry is referred to as "verify bits" and performs an exact matching operation with the input IP address. Hash functions inherently do not have any false negatives. By means of an exact matching operation, the elimination of false positives is ensured as well. This operation is discussed below in §4.1.2.1.

§4.1.2.1 Exemplary Membership Query Module

Figure 3:
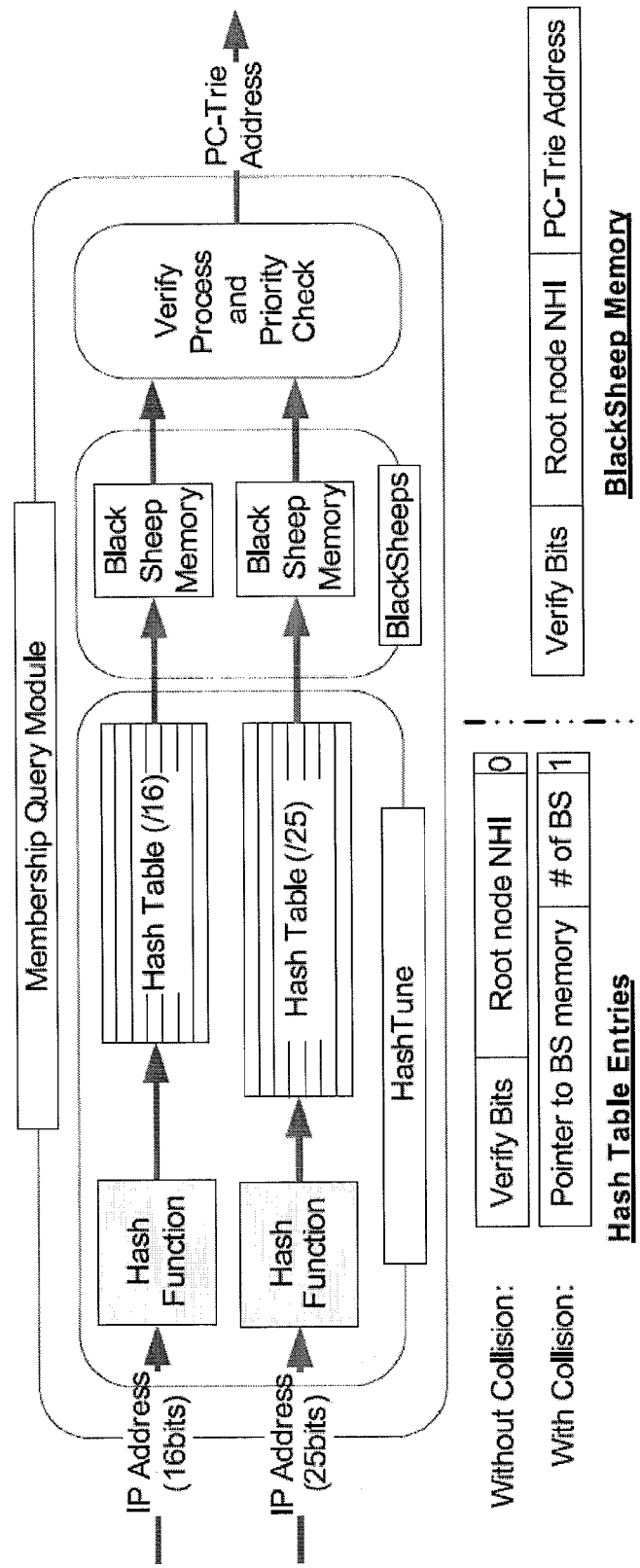
FIG. 3 illustrates a block diagram of an exemplary Membership Query Module consistent with the present invention.

The basic function of the membership query module is to take an IP address as input, process it, and return a corresponding PC-Trie address. A block diagram of an exemplary membership query module is shown in FIG. 3. In a programming phase, all sub-tries are hashed and the contents of hash tables are constructed off-line. HashTune may be used as the hash function. Using HashTune is advantageous because it has a compact data structure and better memory utilization. Since a hash function is used, there are possible collisions. Therefore, the hash table has two different entries: one each for collision cases and another for non-collision cases as shown in FIG. 3. If the hash table entry has a collision, then its Least-Significant Bit ("LSB") is set to "1"; otherwise, it is set to "0" for no collision. The collided items are stored in Black Sheep ("BS") memory located in the membership query module.

Under a querying operation, the input IP address is hashed. Whether this hash entry has a collision or not is determined by checking the LSB of the hash table entry. In the non-collision case, the hash table entry contains Verify Bits and Root node NHI. If the Verify Bits are matched with the input IP address, then the hash result becomes the PC-Trie address for the input IP address. Thus, the PC-Trie addresses are not stored in the hash tables. In the collision case, the hash table entry has a pointer to BS memory. Since a hash may result in one or more collisions, the number of BS collisions is stored for each hash table entry. In the case of more than one collision, the BS memory accessed multiple times if only one BS memory module is used. This can become a bottleneck in the system. Instead, multiple on-chip BS memory modules are used which are accessed in parallel. Based on simulation results, three BS memory modules are needed for IPv4 and fourteen BS memory modules are needed for IPv6.

FIG. 3 also shows BS memory entry contents that are Verify Bits, Root Node NHI, and PC-Trie Address. Thus, whichever Verify Bits of the BS memory entry are matched with the input IP address, the corresponding PC-Trie address is retrieved from the BS memory entry. With the on-chip memory-based collision resolving architecture, using area- and power-consuming TCAMs or CAMs can be avoided. By this membership query operation, only one PC-Trie address is resolved.

§4.1.2.2 Exemplary Hashing Using Hashtune

Figure 4:
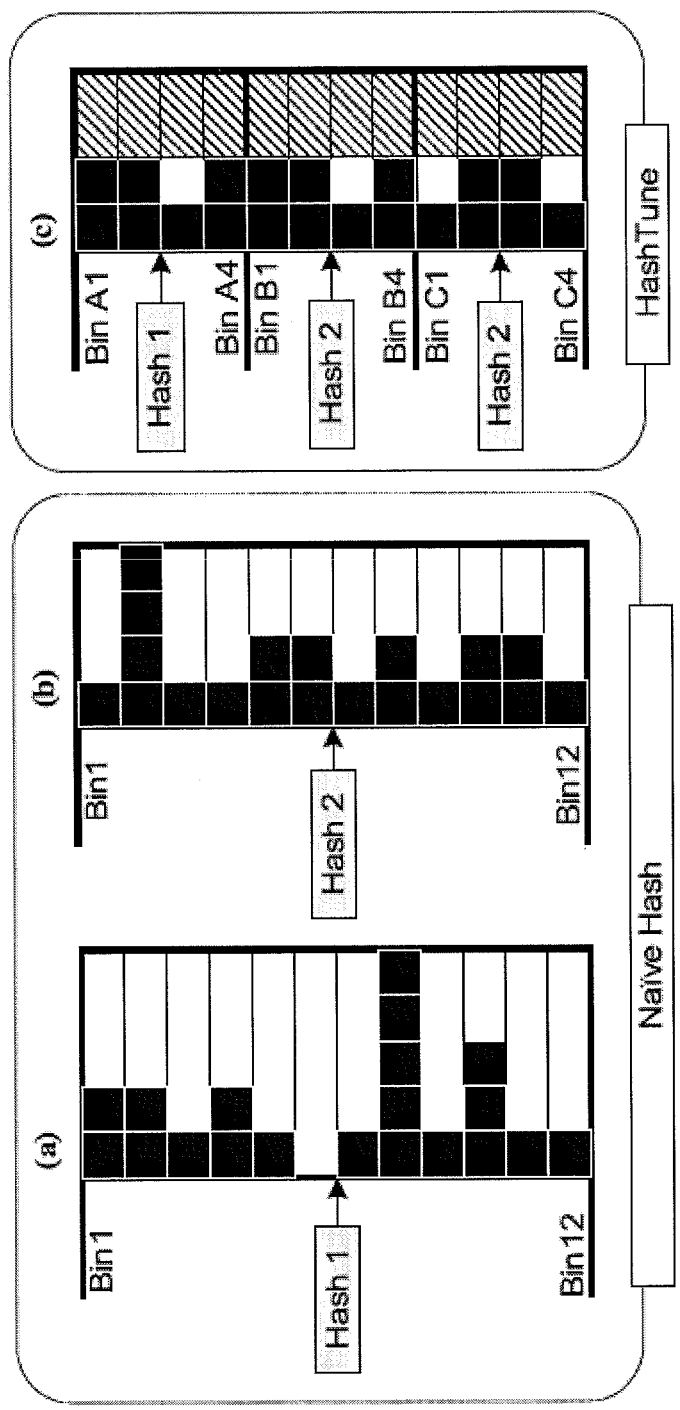
FIG. 4 illustrates a HashTune example in accordance with at least one exemplary embodiment consistent with the present invention.

In FlashTrie, memory efficient Hash-Tune may be used for hashing operations. In contrast with a naive hash function, HashTune has two important advantages: (1) key distribution is more uniform over the entire hash table; and (2) the size of Verify Bits can be reduced. FIGS. 4 (a) and (b) show key distribution using a naive hash approach. Each row represents a bin and each dark square in the row shows a key hashed to that bin. Typically, a naive hash function leads to the non-uniform distribution of prefixes in the hash table. This non-uniformity causes unnecessarily large bin sizes. Even when a good hash function is found for a particular table, after some updates, the distribution of prefixes in the hash table can still become non-uniform.

FIG. 4 (c) shows key distribution using HashTune. In HashTune, the entire hash table is segmented into multiple small hash tables called groups. All groups have the same number of bins. In FIG. 4 (c), there are 12 bins segmented into 3 groups and each group has 4 bins (Group A: bin A1-bin A4, Group B: bin B1-bin B4 and Group C: bin C1-bin C4). Each group may select a different hash function from the pool of hash functions. In the example in FIG. 4, Group A uses Hash 1, and Groups B and C use Hash 2. The selected hash function ID is stored in a Hash ID table, which is also stored in on-chip memory and used for query operations. After applying different hash functions, occupancy of bins in each group, and hence in the entire hash table, becomes even. Because of the balanced key distribution, the hash table size is smaller than in naive approaches, as indicated by shaded areas in FIG. 4.

Another advantage is also derived from grouping. Each group is assigned an ID called Group ID and the ID is selected from several bits of the root node in each sub-trie. For example, an 8-bit group ID will be selected for 256 groups. The group ID from the LSBs of the root node is selected because this balances the number of keys per group. The bits assigned for the group ID can be taken out from the Verify Bits because all items in the group have the same the group ID. For example, resolving 17 bits input and choosing 8 LSBs as the group ID permits the remaining 9 bits to be stored as Verify Bits. As a result, the Verify Bit size and on-chip memory requirements are reduced.

§4.2 Exemplary Flashtrie Architecture and Lookup

Figure 5:
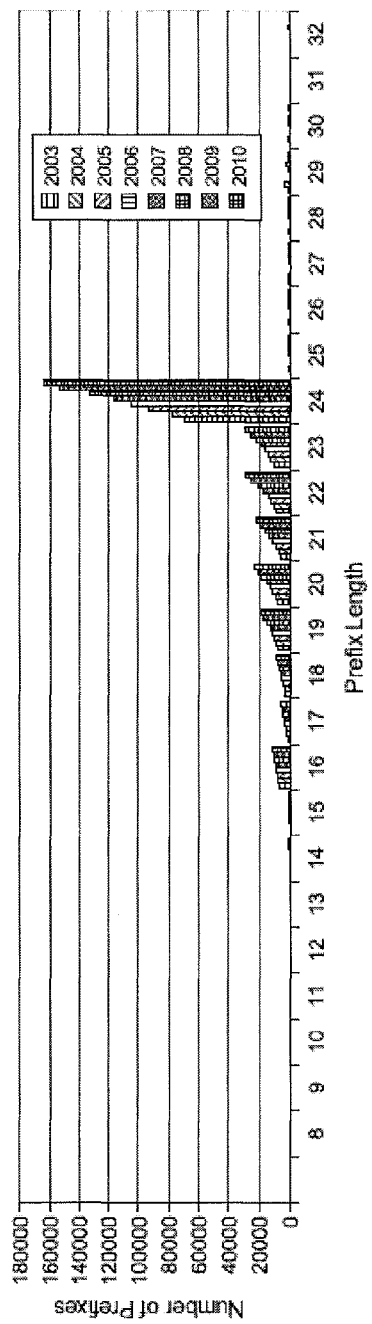
FIG. 5 illustrates IPv4 prefix distribution from 2003 to 2010.

In this section, the construction of an exemplary FlashTrie architecture using an actual routing table as input is described. Prefix distributions of routing tables and determination of the coverage and size (stride size) of sub-tries is first considered. FIG. 5 shows an example of actual prefix distribution for IPv4 based on the length of the prefix from the years 2003-2010 (obtained from the University of Oregon Route Views Project).

Figure 6:
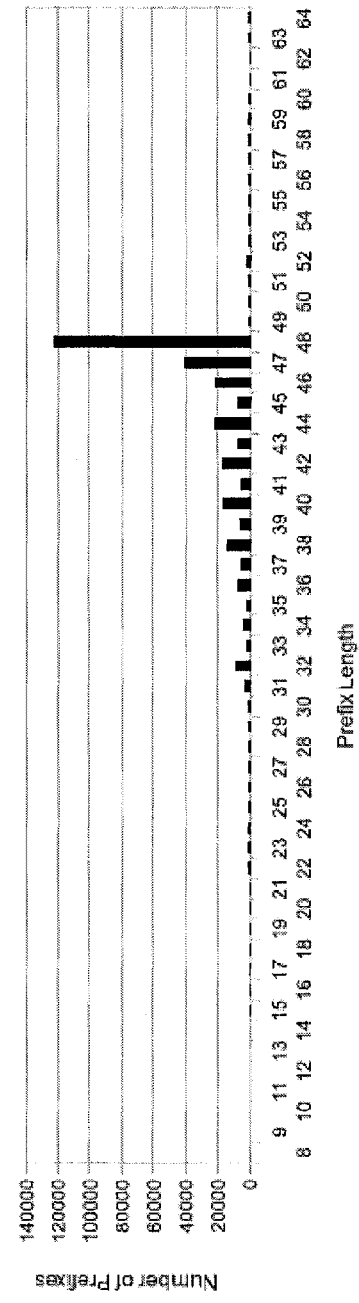
FIG. 6 illustrates synthesized IPv6 prefix distribution (based on IPv4 routing tables).

One of the characteristics of the distribution is the number of prefixes in /24, which is more than 50% of the total number of prefixes. Any multibit-trie based architecture attempts to maintain fewer sub-tries so that memory consumption is less. Assigning /24 in a root of the sub-trie is not a good idea because it requires the number of sub-tries to be equal to the number of prefixes in /24. Thus, /24 is placed at the bottom of the sub-trie. Three levels are selected based on the prefix distribution of FIG. 5. They are IPv4/15 (15 Most-Significant Bits (MSB) of an IPv4 address), IPv4/16 (MSB 16 bits to 24 bits), and IPv4/25 (MSB 25 bits to 32 bits). IPv6 prefix distribution is also considered using real routing tables and expected future IPv6 routing tables. (See, e.g., M. Wang, S. Deering, T. Hain, and L. Dunn, "Non-Random Generator for IPv6 Tables," in *Proc of the IEEE Symposium on High Performance Interconnects*, pp. 35-40 (2004), which is incorporated by reference.) Prefix distribution of the expected future IPv6 routing tables is shown in FIG. 6. As can be appreciated from FIG. 6, the majority of IPv6 prefixes is in /48. Thus, /48 is placed at the bottom of the sub-trie. Next, the overall FlashTrie architecture and the IP route lookup process are described.

§4.2.1 Exemplary Architecture and Lookup Operation

FIG. 7 illustrates the flow of an exemplary IPv4 lookup procedure. The IPv6 lookup procedure is similar except that there are more levels. For example, IPv4 lookup may require the use of two sub-trie levels while IPv6 lookup may require the use of six sub-trie levels.

The input 32-bit IPv4 address is categorized in IPv4/15, IPv4/16, and IPv4/25. IPv4/15 is resolved using Direct Lookup (on-chip), and IPv4/16 and IPv4/25 are resolved using the membership query module (on-chip) and PC-Trie (off-chip). The PC-Trie address, marked *1 in FIG. 7, is resolved from the output of the membership query module.

Suppose "1 0 0" (in binary notation) is the input to this PC-Trie. The PC-Trie bitmap can be traversed as done in a binary trie. That is, traverse to the left child if the bit is "0", otherwise traverse to the right child. Traversing begins from the MSB of input. The aim is to find the longest matching prefix in the PC-Trie. In FIG. 7, the third bit in the bottom (dark square in the PC-Trie) is reached after traversing "1" (Right) and "0" (Left). The contents of the bitmap is "1", which means NHI exists for the input "100". Since this is the longest matching prefix, the address of NHI memory is resolved for this node set.

The address is resolved by a pointer stored with the PC-Trie node and offset calculated from the bitmap. The offset is the number of 1's starting from the root of the PC-Trie until the longest matching location. In this case, the offset is 2 (as there are two 1's before the final location). The pointer is pointing to the beginning of NHI entries in the memory for this PC-Trie. In the example of FIG. 7, the pointer points to the memory location of CA. The offset is added to this memory location to get the exact NHI set EB. Finally, the NHI is selected from the NHI set by the LSB of the input. Since the LSB of the input is "0", E is selected as the final NHI. If LSB is "1", B is selected. For PC-Trie n or a higher Prefix-Compressed Trie, one NHI set contains four or more NHIs. In this case, more than one ($\log 2(n)$) bit from the input destination IP address is used to find the final NHI.

§4.3 Exemplary Flashtrie Update

Online update capability is important for routers in general and is becoming a more critical issue for future routers. As of March 2009, there were four updates observed per second on average but 25,000 updates per second during peak periods (information obtained from Classless Inter-Domain Routing ("CIDR") reports publically available on the Internet). For the update analysis, peak rate is used to demonstrate worst-case update capability. The anticipated growth in routing table entries is 2 million, which is approximately 6.3 times the current amount of routing table entries. If updates also increase proportionately, there would be around 160 k (=25K*6 3) updates per second during peak periods. To support this kind of growth, 10 Mpps (million packets per second) is reserved for lookup operations. This is sufficient for both on-chip and off-chip memory updates, as the next section explains.

§4.3.1 Exemplary on-Chip Memory Update

Next hop information (NHI) of the root at each sub-trie is stored in on-chip memory as described above. FIG. 8 shows two types of exemplary update methods: (1) Direct NHI programming; and (2) Indirect NHI programming. The example in FIG. 8 shows four root nodes of sub-tries represented as I, J, K and L. For direct NHI programming, since there is no intermediate node between each sub-trie root, NHI A of root node I is simply copied to the root nodes, J, K, L of the following level. A problem occurs when an update is required at some upper stream along the path. For instance, if a new route X is to be added in the sub-trie that has a root node I on the path, then all the following root nodes (J, K, L) also need to be updated. The number of updates might be excessively high, especially for IPv6 because of longer addresses (more levels). To avoid this problem, indirect NHI programming is proposed as shown in example (b). In indirect NHI programming, a null value is stored at a root node which doesn't have NHI. This is done to indicate that the actual NHI is located in the root node of upper level. By doing so, the update of X only needs to traverse one level down. Thus, the new X only affects the root node J, but not nodes K and L. By making sure there is only one level of dependency, all root nodes of the intermediate sub-tries are maintained in the on-chip membership query module. In other words, if some intermediate sub-tries do not exist, only root node NHI is created and stored in the membership query module (i.e., if a sub-trie exists at Level(l), root NHIs of the upper level from Level(l−1) to Level(1) exist in the membership query module).

An example of an on-chip update using the indirect NHI programming method is illustrated in FIG. 9. FIG. 9 illustrates four levels of sub-tries and the root NHI which is stored in on-chip memory. In the example shown, an update is applied in the sub-trie in Level 1, and a new route B is added. The update to sub-tries is one level down (Level 2), so the root node of ST2 is modified from null to B. Any update only affects one level below and the far level does not have any influence. Indeed, the root node of ST3 located in Level 3 maintains the same NHI, null.

In the worst case for a 9-bit stride, there can be 511 updates (if the node below the root node has to be updated). Therefore, for future 160 k updates with each update requiring 511 memory accesses, the total updates, in the worst case, will be 81.8 million (=511*160 k), which is less likely to happen. Since this is an on-chip hash table update, 10 Mpps is still sufficient because the on-chip hash table is segmented and stored in individual on-chip memories. Multiple hash tables can be updated independently.

§4.3.2 Exemplary Off-Chip Memory Update

There are two independent off-chip memories: (1) one for Prefix-Compressed Trie (PCTrie); and (2) another for NHI. For PC-Trie, eight memory accesses per update are used because the same PC-Trie is duplicated among all eight banks. This requires 1.28 million packets per second ("Mpps") (=8 banks*160 k updates). For NHI, the worst-case number of memory accesses needed per update is (Stride−$\log_2$(Degree of Compression))*(number of bins). For example, for PC-Trie8 with 9-bit stride, 6 memory accesses are required. If PC-Trie8 is used for all sub-tries, then 7.68 Mpps are needed (6 memory access*8 banks*160 k updates) in the worst case. Thus, 10 Mpps is more than enough to update both on-chip and off-chip memory in real time.

By contrast, Tree Bitmap update is not trivial, especially when inserting new child nodes. This operation requires multiple memory accesses to arrange all child nodes in consecutive memory locations. Moreover, after multiple updates, Tree Bitmap typically performs de-fragmentation to make consecutive memory space available. Meanwhile, the Flash-Trie embodiments consistent with the present invention do not have these problems because they systematically organize hash-based addressing. Items stored in Black Sheep memory hold individual pointers and, therefore, PC-Trie can be allocated without any constraint.

§4.4 Performance Evaluation of an Exemplary Embodiment

For evaluation purposes, a routing table containing 318, 043 routes is used. Two million routes are generated for the future routing table based on the prefix distribution trend. An anticipated IPv6 routing table is synthesized following the methods presented in M. Wang, et al. It uses IPv4 routes and an Autonomous System ("AS") number, giving a more realistic routing table as compared to a randomly generated table.

Thus, the synthesized IPv6 routing table contains 318,043 routes (same as the IPv4 routing table size).

First, sub-tries are extracted to generate the FlashTrie data structure. Table I of FIG. 28 shows the number of sub-tries in each level and the total sub-tries for all three routing tables. A 9-bit stride size is used for the entire evaluation, and detail stride settings are listed in Table I of FIG. 28. Following this setting, performance is evaluated in terms of memory requirements and lookup speed for the IPv4 and IPv6 routing tables. The evaluation is based on the results of simulation and hardware implementation.

§4.4.1 Memory Requirements of Exemplary Embodiment

In at least some FlashTrie embodiments consistent with the present invention, two types of memory are used: (1) on-chip memory, and (2) off-chip memory. The data that is stored in memory and the memory size used to support IPv4 and IPv6 simultaneously is described below.

§4.4.1.1 On-Chip Memory

FlashTrie pushes most of the memory-consuming operation outside of the chip (off-chip memory). Some operations, however, are kept on-chip to enhance lookup performance and on-line updatability. On-chip memory is used for: (1) storing information required for direct lookup for up to /15 (IPv4) or /12(IPv6), (2) storing hash tables used for membership queries, (3) storing a hash ID table (storing a hash ID for each group), and (4) Black Sheep memories for storing collided items in the hash table. The on-chip memory requirements are shown in Table II of FIG. 29. The first 15 bits are resolved by the direct lookup approach in IPv4 with 8 bits NHI (256 kbits=$2^{15}$* 8 bits). Sixty-four (64) hash functions are used for all tables and levels. Taking IPv4/16 from the real routing table as an example, the hash table is segmented into 2,048 groups. Therefore, the hash ID table size will be 12K bits (=2048*$\log_2$(64)bits). The simulation result determines the number of groups and bins in each group. The configurations are summarized in Table III of FIG. 30.

As shown by the results in Table II of FIG. 29, to support 2M IPv4 routes (1.47 Mbits) and 318 k IPv6 routes (8.17 Mbits) simultaneously, 9.64 Mbits of on-chip memory is needed. Thus, three copies of this data can be stored in the on-chip memory of a state-of-the-art FPGA that has 38 Mbits on-chip memory capacity. Also, all on-chip memory has independent dual-ports. Therefore, six FlashTrie lookup engines can fit on one chip.

§4.4.1.2 Off-Chip Memory

The off-chip memory (DRAM) in FlashTrie includes two independent memory chips: (1) PCTrie; and (2) NHI memory. The off-chip memory (DRAM) and the processor(s) have direct independent connection which provides each DRAM exclusive access to the processor as required. Table IV of FIG. 31 shows memory requirements for PC-Trie. The sub-trie size for Tree Bitmap is 1063 bits (internal bitmap+ external bitmap+two pointers), and for FlashTrie it is 83 bits (PC-Trie bitmap+pointer) for 9-bits strides PC-Trie8 (20 bits for each pointer). This significant reduction is because of bitmap compression and the elimination of the external bitmap. Table V of FIG. 32 shows memory requirements for the NHI (assuming 8 bits NHI). The PC-Trie for every level can fit in one bank of DRAM as shown in FIG. 10(*a*). Even if NHI is duplicated, IPv4 and IPv6 NHI can easily be fit into one bank of DRAM as shown in FIG. 10(*b*). The data allocation in FIG. 10(*b*) is based on a 1-Gbit memory (each bank has 128 Mbits with 8 banks). The graph in FIG. 11 shows the off-chip memory required for bitmap and NHI for different degrees of compression of PC-Trie in the FlashTrie as compared to the Tree Bitmap. The result indicates that the reduction in bitmap size is more than 80% (for higher compression degree of PC-Trie).

§4.4.2 Lookup Speed and Timing Analysis

One on-chip FlashTrie lookup engine running at 200-MHz can process one lookup in 5 nsec, which is equivalent to 200 Mpps. By contrast, off-chip memory access is a little more restricted and requires some analysis. Before the timing analysis is discussed in detail below, a quick review of DRAM technology is presented below.

Driven by an enormous market demand, DRAM speed and capacity are increasing rapidly while their power consumption and price are decreasing significantly. DRAMs may reach 12.80 GB/sec of throughput and 4 Gbits of capacity, and it has 8 banks on a chip. Using commercially available DRAM technology (DDR3-1600 with a memory clock of 200 MHz and bus clock 800 MHz), only 5 nsec is required to read 8 burst data (128 bits with 16-bit data bus). Thus, accessing 8 banks takes 40 nsec, which satisfies the timing restriction tRC (38 nsec).

FIG. 12 illustrates how 128 bits is continuously read every 5 nsec with a detailed timing diagram. Row activate ("ACT") and read ("RD") commands are sent sequentially following the timing specification of DDR3 SDRAM. For clarity, commands are presented for each bank. It is clear from FIG. 12 that data from each bank are output, back-to-back, after the tRCD+CL cycle from ACT command.

By using on-chip membership query, FlashTrie needs only one PC-Trie memory access and one independent NHI memory access. These accesses can be pipelined. Hence, the minimum lookup time of the system reaches 5 nsec per lookup, which is equivalent to 200 Mpps in the worst-case (for the minimum packet size, which is 40 bytes in IPv4). Therefore, two FlashTrie engines with two sets of DRAM chips (two PC-Trie and two NHI memories) can reach 400 Mpps. Worst-case IPv6 performance is 50% more than IPv4. The reason is that in FlashTrie, IPv4 and IPv6 have the same number of memory accesses per lookup. Even if update time (10 Mpps per engine) is considered, lookup speed exceeds 100-Gbps (250 Mpps). Moreover, field programmable gate arrays (FPGAs, such as Xilinx Virtex-6), which contain 38 Mbits of block RAM, can have six (6) engines in a single FPGA chip. With a single Virtex-6 FPGA and six (6) sets of DDR3-1600 DRAM chips, FlashTrie can reach 1.2 Bpps, which is more than 480-Gbps for IPv4 and more than 720-Gbps for IPv6 in the worst-case (for a minimum IPv6 packet size of 60 bytes).

Tree Bitmap and FlashTrie timing analyses are presented in FIG. 13 with the IPv6 lookup example (considering that only the first 64 bits of IPv6 are used for lookup). The timing diagram compares the Tree Bitmap and FlashTrie schemes using the same resources. The Tree Bitmap uses the first 12 bits for direct lookup, and the remaining bits are traversed in 6-bit strides. Assume that the Tree Bitmap uses optimization to fit the bitmap into one burst and ignores the DRAM read latency and processing time between levels. In this case, the Tree Bitmap approach requires 10 off-chip DRAM memory accesses (nine external bitmap and one internal bitmap accesses) for one lookup. Therefore, one IPv6 route lookup takes 50 nsec, whereas FlashTrie can perform one lookup per 5 nsec. Therefore, FlashTrie can finish 10 route lookups during the same period (50 nsec). Hence, using the same number of memory chips, FlashTrie can perform ten times faster compared to the Tree Bitmap. In other words, to achieve the same throughput, ten times the amount of memory chips would be needed for Tree Bitmap, which makes Tree Bitmap not feasible for high speed route lookups.

§4.5 Exemplary Optimizations

The amount of on-chip memory is usually limited compared to off-chip memory. Efficient usage of on-chip memory can achieve even higher throughput by duplicating multiple lookup engines. As shown in §4.3 above, Hash Table and Black Sheep memory consume the dominant portion of on-chip memory. In this section, two optimization methods are discussed that will reduce the memory requirements of these two modules.

§4.5.1 Multiple Keys Per Bin

This optimization contributes to reducing the Black Sheep ("BS") memory requirement. The bin of the hash table takes two types of entries: (1) one for the collision (overflow); and (2) another for the non-collision (non-overflow) cases. It contains root NHI and Verify Bits for a prefix in the non-overflow case. Otherwise, it contains the BS memory address and the number of overflows. Assume a hash table allows only one key per bin, and one key is already programmed in the bin. If another key is assigned to the same bin, the bin is now used to store BS memory information (pointer to the BS and number of overflows). The key originally stored in the bin is relocated to the BS memory. Thus, the two keys are stored in the BS memory. It requires a total of three memory slots (one in the hash table and two in the BS memory), which means the memory overhead is 33.3%. Here, a multi-key optimization is applied, which can reduce the memory overhead caused by collisions (overflow). Allowing more than two keys per bin can eliminate the overhead of the overflow. Based on experimental results, it has been determined that majority of the bins have only one or two collisions. Thus taking this optimization, many bins will not require BS memory. This significantly reduces the BS memory requirements.

Two types of settings were experimented with, allowing two or four keys per bin. The results are listed in Table VI of FIG. 33. In Table VI, the multi-key optimization is not applied to the first column for each routing table. The results of adopting two and four entries in a bin are compared with the first column in each routing table. The results show that the on-chip memory requirement of both IPv4 real routing table and IPv6 are decreased from 8% to 16%. Since the total number of entries remains the same, the reductions are mainly contributed from the BS memory, which means that fewer sub-tries are placed into BS memory. As a result, the density of hash table memory becomes higher.

§4.5.2 Incremental Verify Bits

This optimization contributes to reducing the BS memory requirement as well as the hash table size in the membership query module. The hash-based scheme needs to perform a verification operation for the hash result to identify any false positive. The Verify Bits are stored in the hash table and BS memories. Both memories are implemented in on-chip memory, so the size of the Verify Bits directly affects the memory requirements of on-chip memories. Without this optimization, the length of the Verify Bits increases proportionally to the length of the prefixes. For example, the size of the Verify Bits for IPv4/16 is 5 bits, and it becomes 16 bits for IPv4/25. Furthermore, IPv6 requires only 8 bits in the first level (IPv6/13), but increases the requirement to 49 bits in the bottom level (IPv6/58) even though hash tune, which can reduce the length of the Verify bits, is used.

FlashTrie executes all levels of the membership query in parallel. Recall that all root NHIs of intermediate sub-tries (ancestors) exist in the membership query module. In this circumstance, a sub-trie of the input IP address is matched in a lower level, which implies that the shorter sub-tries also exists in the upper levels. Using IPv4 as an example, if the sub-trie of IPv4/25 exists, the root NHI of IPv4/16 can also be found in the membership query module. Verify Bits for both root of sub-tries are stored in the membership query module. As shown in FIG. 14, the Verify Bits of IPv4/16 consist of bits from 31 to 27 of the sub-trie IP address, and Verify Bits of IPv4/25 consist of bits from 31 to 16 of the sub-trie IP address. The Verify Bits [31:27] of the IPv4/25 and IPv4/16 are identical. Thus, the original scheme stores redundant Verify Bits in all levels. The membership query module of IPv4/16 stores Verify Bits of bits [31:27], marked as VB16 in FIG. 14. The module of IPv4/25 needs only bits [26:16], marked as VB25. During the query process, the VB16 will be passed to the module of IPv4/25. The verification for the prefix of IPv4/25 will be compared with the concatenation of VB16 and VB25. In the case of IPv6, the storage of Verify Bits is organized as in FIG. 15. This scheme is called "Incremental Verify Bits".

Table VII of FIG. 34 lists the on-chip memory requirements and comparisons of applying incremental Verify Bits optimization combined with multi-keys optimization. The multikey optimization is not applied to the first column of each routing table. These columns show the performance of applying the incremental Verify Bits scheme only. Compared with the corresponding columns in Table VI of FIG. 33, the scheme gains improvements. Even when multi-keys optimization is applied, additional improvements remain achievable. Although, the improvements for IPv4 are fractional, the improvements in IPv6 are significant. The reason is that even though the requirements of hash table memory and BS memory in IPv4/25 are decreased, their proportions are small. This optimization reduced on-chip memory usage by 40 percent.

Applying these optimizations, the total on-chip memory requirements are reduced from 9.64 Mbits to 5.07 Mbits (1.38 Mbits-IPv4, 3.69 Mbits-IPv6). With the state-of-the-art FPGAs which contain 38 Mbits of dual port on-chip memory, 14 lookup engines can be supported. As a result, a processing speed of 2.8 billion pps can be achieved.

§4.6 Examplary Hardware Implementation

In this section, the architecture of a hardware implementation in an exemplary embodiment consistent with the present invention is described. The hardware utilization of the prototype design is also presented at the end of the section. FIG. 16 shows block diagrams of the FlashTrie lookup engine. The engine includes five main sub-modules: (1) Direct Lookup, (2) Membership Query, (3) PC-Trie Lookup, (4) NHI Lookup, and (5) Priority Checker. When performing lookup, the input IP address is provided to the Direct Lookup and membership query modules. The Direct Lookup Module resolves the NHI in level zero, while the others cope with level one and level two. The membership query module checks if sub-tries exist for the input IP address in the next two levels. If sub-tries do exist, the module generates a PC-Trie address to query off-chip memory (where the bitmap and memory address of NHI set are stored), and forwards it to the PC-Trie Lookup module. The PC-Trie Lookup module is responsible for reading the data from external memory in terms of the input address, traversing the bitmap for further prefix matching, and calculating the address of the target NHI set. Then, the NHI Lookup module uses the address to obtain a set of NHIs from another off-chip memory and picks out the final one with partial IP according to the FlashTrie algorithm.

Each IP address query will have an exact match in level zero, and it also may have sub-trie matches in level one and two. The outcome from the longest match will be the final NHI choice. Finally, the Priority Checker module selects the NHI from Direct Lookup module as output if only a sub-trie matches in the level zero. Otherwise, it returns the NHI from the NHI Lookup module.

§4.6.1 Examplary Hardware Implementation of Direct Lookup Module

The Direct Lookup module is used for level zero NHI lookup. The NHI for this level is stored in an on-chip Block RAM. The module consults the on-chip Block RAM according to the input IP address. Here, only most-significant bits from 31 to 17 are used as the indexing address to fetch NHI out of memory. The fetched NHI is stored in a FIFO buffer until matching procedures in other levels are completed. Then, the NHI for the input IP address is chosen between them.

§4.6.2 Examplary Hardware Implementation of Membership Query Module

Once the IP address is inputted into the lookup engine, the sub-trie matching procedures of variant length are executed in parallel. The membership query module checks if sub-tries exist for the input IP address. For the IPv4 lookup, the binary trie is divided into levels of prefixes of lengths 16 and 25 and marked as level one and two, respectively. As shown in FIG. 17, each level has an individual PC-Trie Address Generator for parallel lookup and PC-Trie address generation. Bits [31:16] of the input IP address are used as the input for module /16, while bits [31:7] are for module /25. Bits [15:0] of the IP address are stored in the FIFO buffer for further use. The generators for different levels are basically the same in structure and operations. The generator for level two is used as an example here and shown in FIG. 18. HashTune is used in order to store as many sub-tries as is necessary in limited memory slots. The sub-tries are grouped in terms of partial bits of its prefix. Each group can use a hash function to determine the position of the memory slot for storing the information of the sub-trie. The LSB 11 bits of the generator's input are treated as a group number to query the Hash ID memory for its hash function. Then, the whole input is involved in calculating the address, used to query the on-chip hash table memory, by employing HashTune.

The output from hash table memory can be interpreted in two ways. As discussed above, it is possible that more than one sub-trie is hashed into the same bin, which results in collision. In this case, the output is taken as a query address to further refer to the BS memory. Otherwise, it is used to verify the existence of the sub-trie for the input by comparing the Verify Bits from the output with the input. In an actual implementation, the BS memories are queried whether the collision happens or not. Then, the verification compares the bits of the input with the outcomes from all BS memories as well as the hash table memory in the Matching Checker module. If it is identical to the one from hash table, the output address of the Matching Checker module is the same as the one used to query the hash table. Otherwise, it will be extracted from the BS memory's outcome, whichever Verify Bits of the BS memory entry are matched with the input IP address.

§4.6.3 Examplary Hardware Implementation of PC-Trie and NHI Lookup

If a sub-trie is found for the input IP address in the Membership Query module, the IP address may have longer prefix matching in the sub-trie, which is stored as a PC-Trie. The PC-Trie Lookup module, as shown in FIG. 19, uses the address generated by the membership query module, to refer to the off-chip memory. The DDR2 interface employs a DDR2 memory controller, generated by the Xilinx Memory Interface Generator ("MIG"). The data from the off-chip memory consists of the bitmap and NHI set base address for a sub-trie. The bitmap is traversed to determine further matching with the partial IP address, the remainder from the membership query stage. Then, the offset of the memory position is counted, as discussed in §4.2.1 above, and is added to the NHI set base address, resulting in the address of the NHI set. The partial IP address results in the NHI index by removing the bits used for partial matching. Then, the NHI lookup module, whose architecture is shown in FIG. 20, applies the NHI set address to query another off-chip memory, which stores the NHI set data. The resulting NHI set contains 16 NHIs. The final NHI for the input address is selected based on the NHI index.

§4.6.4 Examplary Hardware Implementation Result

The FlashTrie lookup engine is implemented on a Xilinx Virtex-4 FX100 FPGA chip, which has 42,176 slices and 376 block RAMs. The development environment is ISE 10.1. The design is downloaded on the FPGA on a board PLDA XpressFX. The board is equipped with two 1-Gbit DDR2 SDRAMs. Each independently connects to the FPGA chip. The prototype design uses one DRAM chip for bitmap storage, and another for NHI. Both DRAMs have a 16-bit data bus. The burst size is configured as eight (8), in which 128 bits of data can be read once. The whole design, including the DRAMs, runs at 200 MHz (bus clock 400 MHz). The memory controllers are generated by the Xilinx Memory Interface Generator (MIG 2.3). The input to the lookup engine is placed in an on-chip memory and fed into it. The resource utilizations are listed in Table VIII of FIG. 35. One lookup engine is employed in the prototype. The total occupied slices are 8% and Lookup tables (LUTs) are 4%. The used block RAM/FIFOs are 29% of the FPGA capacity.

§4.7 Exemplary Methods

FIG. 21 is a flow diagram of one exemplary method 2110 consistent with the present invention for performing an Internet Protocol (IP) network lookup. A forwarding device may receive an IP network address of a destination device (Block 2120) and then select a detection path based on IP protocol version (e.g., IPv4, IPv6, etc.) (Block 2125). The detection paths for an IPv4 address lookup and an IPv6 address lookup are similar except that the number if bits used by a direct memory lookup for each type of address may be different, and the number of sub-trie levels used may be different (e.g., an IPv4 address lookup may require the use of two sub-trie levels while IPv6 address lookup may require the use of six sub-trie levels). Regardless of which detection path is select, at that point, the method 2110 may perform, in parallel, (1) a direct memory lookup of the first next hop information table (stored in on-chip, internal processor memory) using the IP network address and (2) a query of membership query information (stored in on-chip, internal processor memory) using the IP network address. (Blocks 2130 and 2140, respectively) A first set of next hop information is then determined. (Block 2131). Simultaneously, the location of a Prefix-compressed Trie (PC-Trie) is determined (Block 2140) The method 2110 then searches the determined PC-Trie (stored in off-chip, external processor memory) to determine a location and an offset with a second next hop information table for the desired information. (Block 2142) The method 2110 determines a second set of NHI information using the determined location and the offset within the second NHI information table. (Block 2143) The prefix lengths included in first set of NHI information and the second set of NHI information are then compared to determine the longest prefix match. (Block 2150) The longest prefix match is then selected for use in determined the next hop device. (Block 2160) The method may then be left. (Block 2170)

FIG. 22 is a flow diagram of another exemplary method 2210 consistent with the present invention for creating and storing data structures representing network forwarding information used for network route lookup. The method 2210 may accept a routing table including prefixes of destination addresses and next hop information associated with the prefixes. (Block 2215) The method 2210 may then create (1) a first next hop information table using the accepted routing table (Block 2220), (2) a plurality of prefix-compressed tries using the accepted routing table (Block 2225), (3) membership query information using the plurality of prefix-compressed tries (Block 2230), and (4) a second next hop information lookup table using the plurality of the prefix-compressed tries (Block 2235). The method 2210 may then store (1) the first next hop information table in on-chip memory (i.e., internal processor memory) (Block 2240), (2) membership query information in on-chip memory (i.e., internal processor memory) (Block 2245), (3) the plurality of prefix-compressed tries in off-chip memory (i.e., external processor memory) (Block 2250), and (4) the second next hop information lookup table in off-chip memory (i.e., external processor memory) (Block 2255). The method 2210 may then be left. (Block 2260)

FIG. 23 is a flow diagram of another exemplary method 2310 consistent with the present invention for creating and storing data structures representing network forwarding information used for network route lookup. The method 2310 may accept a routing table including prefixes of destination addresses and next hop information associated with the prefixes. (Block 2315) The method 2310 may then create a binary tree representation of forwarding information. (Block 2320) The method 2310 may then create a binary tree representation of forwarding information. (Block 2320) The method 2310 may then divide binary tree representation into multiple levels of sub-trie data structures such that (1) each of the plurality of levels includes at least one sub-trie data structure, (2) each of the sub-trie data structures includes one or more nodes, and (3) the one or more nodes including a root node at the root of the sub-trie data structure. (Block 2325) For each of the sub-trie data structures created, the method 2310 may then determines if the root node of the sub-trie has associated NHI. (Blocks 2330, 2335 and 2360) If the root node has associated NHI, the associated NHI is stored in the root node location. (Block 2340). If the root node does not have associated NHI, the method 2310 may then determine if there is any NHI along the path in the parent sub-trie. (Block 2345) If there isn't any NHI along the path in the parent sub-trie, a null value is stored in the root node location. (Block 2350) If there does exits NHI along the path in the parent sub-trie, a copy of that NHI is stored in the root node location. (Block 2355). The method 2310 may then be left. (Block 2365).

FIG. 24 is a flow diagram of an exemplary method 2410 consistent with the present invention for updating data structures representing network forwarding information used for network route lookup. The method 2410 may receive new route forwarding information including prefixes of destination addresses and next hop information associated with the prefixes wherein the information about the new route includes an address prefix and a address length. (Block 2415) The method 2410 may then identify a node in a sub-trie to which the new route information belongs to using the received address prefix and address length. (Block 2420). The method 2410 may then determining whether the destination sub-trie data structure which includes the identified node exists. (Block 2425) If the destination sub-trie data already exists, method 2410 may then store the new route information in the identified node, wherein the identified node is located in a first sub-trie at a first level. (Block 2435) If the destination sub-trie data structure does not exist, the method 2410 may first create a new sub-trie which includes the identified node (Block 2430), and then store the new route information in the identified node within the new sub-trie created, wherein the identified node is located in a first sub-trie at a first level. (Block 2435) The method 2410 may then update the root node of descendent sub-tries located one level down with the new route forwarding information. (Block 2440) The method 2410 may then be left. (Block 2445)

FIG. 25 is a flow diagram of an exemplary method 2510 consistent with the present invention for deleting network route information from data structures representing network forwarding information used for network route lookup. The method 2510 may receive information about a route to be deleted from the sub-trie data structures, wherein the information about the route includes an address prefix and an address length. (Block 2515) The method 2510 may then identify a node in a sub-trie to which the route information to be deleted belongs to using the received address prefix and address length. (Block 2520). The method 2510 may then delete the route information from the identified node. (Block 2525). The method 2510 may then determine whether or not all nodes in the destination sub-trie have been deleted. (Block 2530) If all nodes from the destination sub-trie have not been deleted, the method 2510 may then update the root node of descendant sub-tries located one level down with the deleted route information. (Block 2540). If the method 2510 determines that all nodes from the destination sub-trie have been deleted, the method 2510 may then delete the destination sub-trie (Block 2535) before updating the root node of descendant sub-tries located one level down with the deleted route information (Block 2540). The method 2510 may then be left. (Block 2545)

FIG. 26 is a flow diagram of an exemplary method 2610 consistent with the present invention for updating data structures representing network forwarding information used for network route lookup. The method 2610 may receive information about a route to be updated within a sub-trie data structure, wherein the information about the route includes an address prefix and an address length. (Block 2615) The method 2610 may then identify a node in a sub-trie to which the route information to be updated belongs to using the received address prefix and address length. (Block 2620). The method 2610 may then updated the route information from the identified node. (Block 2625). The method 2610 may then update the root node of descendant sub-tries located one level down with the updated route information (Block 2630). The method 2610 may then be left. (Block 2635)

§4.8 Exemplary Apparatus

FIG. 27 is high-level block diagram of a machine 2700 which may perform one or more of the operations discussed above. Machine 2700 includes a processor(s) 2710, an input/output interface unit(s) 2730, a storage device(s) 2720, and a system bus(es) and/or a network(s) 2740 for facilitating the communication of information among the coupled elements. At least some of the storage device(s) have direct independent connections with the processor(s) which provide the storage device(s) exclusive access to the processor(s) as required. An input device(s) 2732 and an output device(s) 2734 may be coupled with the input/output interface(s) 2730. Operations of the present invention may be effected by the processor 2710 executing instructions. The instructions may be stored in the storage device 2720 and/or received via the input/output interface 2730. The instructions may be functionally grouped into processing modules. Although not shown, more than one of some or all of these components may be provided.

Machine 2700 may be a router or a label-switching router for example. In an exemplary router, the processor(s) 2710 may include a microprocessor, a network processor, and/or (e.g., custom) integrated circuits. In the exemplary router, the storage device(s) 2720 may include one or more ROM, RAM, SDRAM, SRAM, SSRAM, DRAM, flash drive, hard disk drive, and/or flash card. At least some of these storage device(s) 2720 may include program instructions defining an operating system, a protocol module (e.g. daemon) and/or other modules. In one embodiment, the methods of the present invention may be performed by a microprocessor executing stored program instructions (e.g., defining a part of the protocol module or daemon). At least a portion of the machine executable instructions may be stored (temporarily or more permanently) on the storage device(s) 2720 and/or may be received from an external source via an input interface unit(s) 2730. Finally, in the exemplary router, the input/output interface unit(s) 2730, input device(s) 2732 and output device 2734 may include interfaces to terminate communications links.

Naturally, the operations of the exemplary methods may be performed on systems other than routers. Such other systems may employ different hardware and/or software.

§4.9 Conclusions

Online update capability is important for routers in general and is becoming a more critical issue for routers. As can be appreciated from the foregoing, an efficient and fast way to update stored data structures representing network forwarding information used for network route lookup. By making sure there is only one level of dependency between data structures storing forwarding information, these data structures may be updated quickly and with minimal overhead.

What is claimed is:

1. A computer-implemented method for updating stored data structures representing network forwarding information used for network route lookup, the stored data structures corresponding to a plurality of levels of sub-trie data structures of a prefix-compressed trie representation of forwarding information from a routing table, each of the plurality of levels including at least one sub-trie data structure, and each of the sub-trie data structures including one or more nodes, the one or more nodes including a root node at the root of the sub-trie data structure which stores, in on-chip memory, one of (1) next hop information if the root node has associated next hop information, or (2) a null value if the root node does not have associated next hop information, wherein the null value indicates that next hop information to be used for the root node of the sub-trie data structure is located in the root node of an upper level, and wherein information defining nodes other than root nodes are stored in off-chip memory, the computer-implemented method comprising:
   a) receiving, by a forwarding device, information about a new route to be included as forwarding information in the sub-trie data structures, wherein the information about the new route includes an address prefix and an address length;
   b) identifying, by the forwarding device and using the received address prefix and address length, a node in a destination sub-trie data structure to which the new route forwarding information will be stored in;
   c) storing in the off-chip memory, by the forwarding device, the new route forwarding information in the identified node, wherein the identified node is located in a first sub-trie at a first level; and
   d) updating in the on-chip memory, by the forwarding device, the root node of any sub-trie data structures that are both (1) descendants of the identified node, and (2) located at a second level which is one level below the first level which includes the identified node, with the new route forwarding information.

2. The computer-implemented method of claim 1, wherein the next hop information indicates an address of a second forwarding device to which a data packet is to be sent on the way to the data packet's final destination.

3. The computer-implemented method of claim 1, wherein the sub-trie data structures are at least one of (A) a next hop information lookup table or (B) a prefix-compressed trie.

4. The computer-implemented method of claim 1, wherein the act of storing the new route forwarding information in the identified node further includes
   determining, by the forwarding device, that the destination sub-trie data structure which includes the indentified node does not exist,
   creating, by the forwarding device, a new sub-trie data structure which includes the identified node, and
   storing, by the forwarding device, the new route forwarding information in the identified node in the new sub-trie data structure, wherein the identified node is located in a first sub-trie at a first level.

5. The computer-implemented method of claim 1, wherein the on-chip memory is internal processor memory of the forwarding device.

6. The computer-implemented method of claim 1, wherein the on-chip memory is included on the same chip as a central processing unit of the forwarding device.

7. The computer-implemented method of claim 1, wherein the off-chip memory is external processor memory of the forwarding device.

8. The computer-implemented method of claim 1, wherein the off-chip memory is not included on the same chip as a central processing unit of the first forwarding device.

9. The computer-implemented method of claim 1, wherein the off-chip memory is DRAM.

10. A computer-implemented method for updating stored data structures representing network forwarding information used for network route lookup, the stored data structures corresponding to a plurality of levels of sub-trie data structures of a prefix-compressed trie representation of forwarding information from a routing table, each of the plurality of levels including at least one sub-trie data structure, and each of the sub-trie data structures including one or more nodes, the one or more nodes including a root node at the root of the sub-trie data structure which stores, in on-chip memory, one of (1) next hop information if the root node has associated next hop information, or (2) a null value if the root node does not have associated next hop information, wherein the null value indicates that next hop information to be used for the root node of the sub-trie data structure is located in the root node of an upper level, and wherein information defining nodes other than root nodes are stored in off-chip memory, the computer-implemented method comprising:
   a) receiving, by a forwarding device, information about a route to be deleted from the sub-trie data structures, wherein the information about the route includes an address prefix and an address length;
   b) identifying, by the forwarding device and using the received address prefix and address length, a node in a destination sub-trie data structure which stores the information about a route to be deleted;
   c) deleting from the off-chip memory, by the forwarding device, the route information from the identified node; and
   d) updating in the on-chip memory, by the forwarding device, the root node of any sub-trie data structures that are both (1) descendants of the identified node, and (2)

located at a second level which is one level below the first level which includes the identified node, with the deleted route information.

11. The computer-implemented method of claim 10, wherein the sub-trie data structures are at least one of (A) a next hop information lookup table or (B) a prefix-compressed trie.

12. The computer-implemented method of claim 10, wherein the act of deleting the route information from the identified location of the node further includes
   determining, by the forwarding device, that all nodes in the destination sub-trie have been deleted, and
   deleting, by the forwarding device, the destination sub-trie.

13. The computer-implemented method of claim 10, wherein the on-chip memory is internal processor memory of the forwarding device.

14. The computer-implemented method of claim 10, wherein the on-chip memory is included on the same chip as a central processing unit of the forwarding device.

15. The computer-implemented method of claim 10, wherein the off-chip memory is external processor memory of the forwarding device.

16. The computer-implemented method of claim 10, wherein the off-chip memory is not included on the same chip as a central processing unit of the first forwarding device.

17. The computer-implemented method of claim 10, wherein the off-chip memory is DRAM.

18. Apparatus used for updating stored data structures representing network forwarding information used for network route lookup, the stored data structures corresponding to a plurality of levels of sub-trie data structures of a prefix-compressed trie representation of forwarding information from a routing table, each of the plurality of levels including at least one sub-trie data structure, and each of the sub-trie data structures including one or more nodes, the one or more nodes including a root node at the root of the sub-trie data structure which stores, in on-chip memory, one of (1) next hop information if the root node has associated next hop information, or (2) a null value if the root node does not have associated next hop information, wherein the null value indicates that next hop information to be used for the root node of the sub-trie data structure is located in the root node of an upper level, and wherein information of nodes other than root nodes are stored in off-chip memory, the apparatus comprising:
   a) at least one processor;
   b) at least one input device; and
   c) at least one storage device storing program instructions which, when executed by the at least one processor, performs a method including:
      1) receiving information about a new route to be included as forwarding information in the sub-trie data structures, wherein the information about the new route includes an address prefix and an address length;
      2) identifying, using the received address prefix and address length, a node in a destination sub-trie data structure to which the new route forwarding information will be stored in;
      3) storing, in the off-chip memory, the new route forwarding information in the identified node, wherein the identified node is located in a first sub-trie at a first level; and
      4) updating, in the on-chip memory, the root node of any sub-trie data structures that are both (1) descendants of the identified node, and (2) located at a second level which is one level below the first level which includes the identified node, with the new route forwarding information.

19. Apparatus used for updating stored data structures representing network forwarding information used for network route lookup, the stored data structures corresponding to a plurality of levels of sub-trie data structures of a prefix compressed trie representation of forwarding information from a routing table, each of the plurality of levels including at least one sub-trie data structure, and each of the sub-trie data structures including one or more nodes, the one or more nodes including a root node at the root of the sub-trie data structure which stores, in on-chip memory, one of (1) next hop information if the root node has associated next hop information, or (2) a null value if the root node does not have associated next hop information, wherein the null value indicates that next hop information to be used for the root node of the sub-trie data structure is located in the root node of an upper level, and wherein information of nodes other than root nodes are stored in off-chip memory, the apparatus comprising:
   a) at least one processor;
   b) at least one input device; and
   c) at least one storage device storing program instructions which, when executed by the at least one processor, performs a method including:
      1) receiving information about a route to be deleted from the sub-trie data structures, wherein the information about the route includes an address prefix and an address length;
      2) identifying, using the received address prefix and address length, a node in a destination sub-trie data structure which stores the information about a route to be deleted;
      3) deleting from the off-chip memory, the route information from the identified node; and
      4) updating, in the on-chip memory, the root node of any sub-trie data structures that are both (1) descendants of the identified node, and (2) located at a second level which is one level below the first level which includes the identified node, with the deleted route information.

* * * * *